(12) United States Patent
Lu et al.

(10) Patent No.: US 10,688,521 B1
(45) Date of Patent: Jun. 23, 2020

(54) LANGMUIR-BLODGETT DOUBLE TROUGH SYSTEM

(71) Applicants: Weixing Lu, Los Angeles, CA (US); Allan Roberts, Buena Park, CA (US); Huilin Zhou, Hefei (CN)

(72) Inventors: Weixing Lu, Los Angeles, CA (US); Allan Roberts, Buena Park, CA (US); Huilin Zhou, Hefei (CN)

(*) Notice: Subject to any disclaimer, the term of this patent is extended or adjusted under 35 U.S.C. 154(b) by 0 days.

(21) Appl. No.: 16/431,462

(22) Filed: Jun. 4, 2019

(51) Int. Cl.
| | |
|---|---|
| *B05C 11/11* | (2006.01) |
| *B05C 3/02* | (2006.01) |
| *B05D 1/20* | (2006.01) |
| *B82Y 40/00* | (2011.01) |
| *B82Y 30/00* | (2011.01) |

(52) U.S. Cl.
CPC ............. *B05C 11/11* (2013.01); *B05C 3/02* (2013.01); *B05D 1/202* (2013.01); *B05D 1/206* (2013.01); *B82Y 30/00* (2013.01); *B82Y 40/00* (2013.01)

(58) Field of Classification Search
CPC ........... B05D 1/206; B05C 11/11; B05C 3/09; B05C 11/00; B82Y 30/00; B82Y 40/00
See application file for complete search history.

(56) References Cited

U.S. PATENT DOCUMENTS

| | | | | |
|---|---|---|---|---|
| 4,511,604 A | * | 4/1985 | Barraud ................ | B05C 3/02 118/402 |
| 4,645,693 A | * | 2/1987 | Roberts ................ | B05C 3/02 118/402 |
| 4,646,678 A | * | 3/1987 | Grunfeld .............. | B05C 3/02 118/402 |
| 5,033,404 A | * | 7/1991 | Grunfeld .............. | B05D 1/206 118/403 |
| 2006/0134326 A1 | * | 6/2006 | Watanabe ............. | B05D 1/20 427/180 |

FOREIGN PATENT DOCUMENTS

JP           62294434 A  * 12/1987  ............ B82Y 30/00

* cited by examiner

*Primary Examiner* — Binu Thomas
(74) *Attorney, Agent, or Firm* — Michael D. Eisenberg

(57) ABSTRACT

A Langmuir-Blodgett trough comprising a middle barrier, configured for creating two different layers of material over the surface of a single subphase liquid. The first layer of material is located on a first side of the middle barrier, while the second layer of material is located on a second side of the middle barrier. The through comprises an adjustment apparatus which comprises a first grooved edge, a second grooved edge, a first side barrier, and a second side barrier. The first side barrier and a second side barrier extend between the first grooved edges. The motion of the first and second side barriers is configured to adjust the surface areas of the first and second materials.

12 Claims, 34 Drawing Sheets

LANGMUIR-BLODGETT DOUBLE TROUGH SYSTEM

TECHNICAL FIELD

This invention relates to Langmuir-Blodgett (LB) trough systems.

BACKGROUND OF THE INVENTION

Amphiphilic materials spread at the air/water interface have been the subject of intensive study over a long period. Langmuir-Blodgett (LB) trough systems include areas that contain a liquid support subphase (e.g. water) and movable barriers that enclose the surface of the support liquid phase on which monomolecular layers of suitable substances (e.g. substances having amphiphilic molecules) can be produced. The structure and physical properties of such layers can be controlled by changing the surface area enclosed by the movable barriers.

Once a monomolecular layer (also called monolayer) having a preferred structure is produced on the surface of the subphase liquid, the monolayer can be transferred onto solid substrates, in which form they are often referred to as Langmuir-Blodgett (LB) films. The monomolecular layers are prepared by depositing a small quantity of a solution of the substance onto the surface of the subphase liquid and allowing the solvent to evaporate leaving molecules of the solute spread discontinuously over the surface of the subphase liquid. The molecules of the solute are then drawn together by reducing the surface of the subphase liquid upon which the molecules are spread, using movable barriers, until the desired monolayer is obtained. The formation of the monolayer can be detected by monitoring the surface pressure using an electronic micro balance, where a sharp rise in pressure indicates that a continuous monolayer has been achieved.

The isotherm of a film at the surface of the subphase liquid is a plot of the film's surface pressure versus surface area. The isotherm measurement technique has been widely used to characterize the property of molecules, typically nanomaterials and biomolecules which are very expensive. Different molecules have different sizes and different interactions between them, and the barriers cannot move too close to avoid disturbing a sensor plate or sensor wire between the barriers, so that the configuration of the trough width (W) versus trough length (L) should be optimized in size (W×L) and profile (W/L) to be able to measure the full isotherm using a minimal amount of the expensive substances. To solve the problem, different sized troughs with different configurations have been made to adapt to different substances for different applications. This approach makes it expensive, difficult and time consuming to switch troughs for different applications.

BRIEF SUMMARY OF EMBODIMENTS OF THE INVENTION

It would be advantageous to have a LB trough system in which both the size and the profile of the surface area of the layer/film can be controlled. It would also be advantageous to have a novel LB trough system, which enables the creation of two separate layers/films over respective areas of a single subphase liquid.

Therefore, an aspect of some embodiments of the present invention relates to a Langmuir-Blodgett trough, comprising a walled trough base, a first transverse compression barrier, a second transverse compression barrier, and a middle barrier. The walled trough base is configured for holding a subphase liquid. The first transverse compression barrier extends across the trough base along a first axis, and is configured for being moved along a first motion axis at a non-zero angle with the first axis, the first transverse barrier being configured to contact material located on the surface of the subphase liquid and to prevent the passage of the material from a first side to a second side of the first transverse barrier. A second transverse compression barrier extends across the trough base along a second axis parallel to the first axis, and is configured for being moved along a second motion axis parallel to the first motion axis, the second transverse barrier being configured to contact material located on the surface of the subphase liquid and for preventing the passage of the material from a first side to a second side of the second transverse barrier. The middle barrier extends across the trough base along a third axis and is positioned between the first transverse compression barrier and the second transverse compression barrier, the middle barrier being configured to contact material located on the surface of the subphase liquid and for preventing the passage of the material from a first side to a second side of the middle barrier. Movement of the first transverse compression barrier is configured for compressing a first material floating on the subphase liquid between the first transverse compression barrier and the middle barrier to form a first layer, while enabling the subphase liquid to move under the first transverse compression barrier. Movement of the second transverse compression barrier is configured for compressing a second material floating on the subphase liquid between the second transverse compression barrier and the middle barrier to form a second layer, while enabling the subphase liquid to move under the second transverse compression barrier.

In a variant, the middle barrier comprises a rotatable section configured to be rotated along a rotation axis, and a substrate holder joined to the rotatable section and configured to rotate with the rotatable section. The substrate holder is configured to hold a substrate, such that a rotation of the substrate holder is configured to dip the substrate into the subphase liquid via the first layer and to cause the substrate to emerge from the subphase liquid via the second layer, thereby enabling the substrate to be coated with first material and second material via a single rotational motion.

The rotation axis may be parallel to the third axis.

In another variant, the third axis is parallel to the first axis and the second axis.

In a further variant, the first motion axis is perpendicular to the first axis and the second axis.

In yet a further variant, the first material and the second material are the same material, or the first material and the second material are different materials.

In a variant, the rotatable section is configured to be selectively rotated in both rotation directions around the rotation axis.

In another variant, the walled trough base comprises a platform elevated with respect to a bottom of the trough base, the platform being surrounded by and in contact with walls of the trough base, the platform comprising a dipping well which extends downward and is closed on the bottom, such that the subphase fluid is configured to be contained on the platform and in the well.

In a further variant, the trough base comprises a first side wall, a second side wall opposite to the first side wall, a first transverse wall joined to the first side wall and to the second side wall, and a second transverse wall opposing to the first transverse wall and joined to the first side wall and to the second side wall.

The first side wall may be parallel to the second side wall, and the first transverse wall may parallel to the second transverse wall.

In yet a further variant, the middle barrier is configured to be moved along a third motion axis parallel to the first and second motion axes.

Another aspect of some embodiments of the present invention relates to a Langmuir-Blodgett trough, comprising a walled trough base, a first transverse compression barrier, and a middle barrier. The walled trough base is configured for holding a subphase liquid. The first transverse compression barrier extends across the trough base along a first axis, and is configured for being moved along a first motion axis at a non-zero angle with the first axis, the first transverse barrier being configured to contact material located on the surface of the subphase liquid and to prevent the passage of the material from a first side to a second side of the first transverse barrier. The middle barrier extends across the trough base along a second axis parallel to the first axis, and is configured for being moved along a second motion axis parallel to the first motion axis, the middle barrier being configured to contact material located on the surface of the subphase liquid and for preventing the passage of the material from a first side to a second side of the middle barrier. Movement of the first transverse compression barrier is configured for compressing a first material floating on the subphase liquid between the first transverse compression barrier and the middle barrier to form a first layer, while enabling the subphase liquid to move under the first transverse compression barrier. Movement of the middle barrier is configured for compressing a second material floating on the subphase liquid between a wall of the trough base and the middle barrier to form a second layer, while enabling the subphase liquid to move under the middle barrier.

In a variant, the middle barrier comprises a rotatable section configured to be rotated along a rotation axis, and a substrate holder joined to the rotatable section and configured to rotate with the rotatable section. The substrate holder is configured to hold a substrate, such that a rotation of the substrate holder is configured to dip the substrate into the subphase liquid via the first layer and to cause the substrate to emerge from the subphase liquid via the second layer, thereby enabling the substrate to be coated with first material and second material via a single rotational motion.

In another variant, the rotation axis is parallel to the first axis and the second axis.

In yet another variant, the first motion axis is perpendicular to the first axis and the second axis.

In a further variant, the walled trough base comprises a platform elevated with respect to a bottom of the trough base, the platform being surrounded by and in contact with walls of trough base, the platform comprising a well extending downward and being closed on the bottom, such that the subphase fluid is configured to be contained on the platform and in the well.

In yet a further variant, the trough base comprises a first side wall, a second side wall opposite to the first side wall, a first transverse wall joined to the first side wall and to the second side wall, a second transverse wall opposing to the first transverse wall and joined to the first side wall and to the second side wall.

The first side wall may be parallel to the second side wall, while the first transverse wall may parallel to the second transverse wall.

In a variant, the first material and the second material are the same material, or the first material and the second material are different materials.

In another variant, the rotatable section is configured to be selectively rotated in both rotation directions around the rotation axis.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1b is an isometric view of the LB trough of FIG. 1a;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1A:
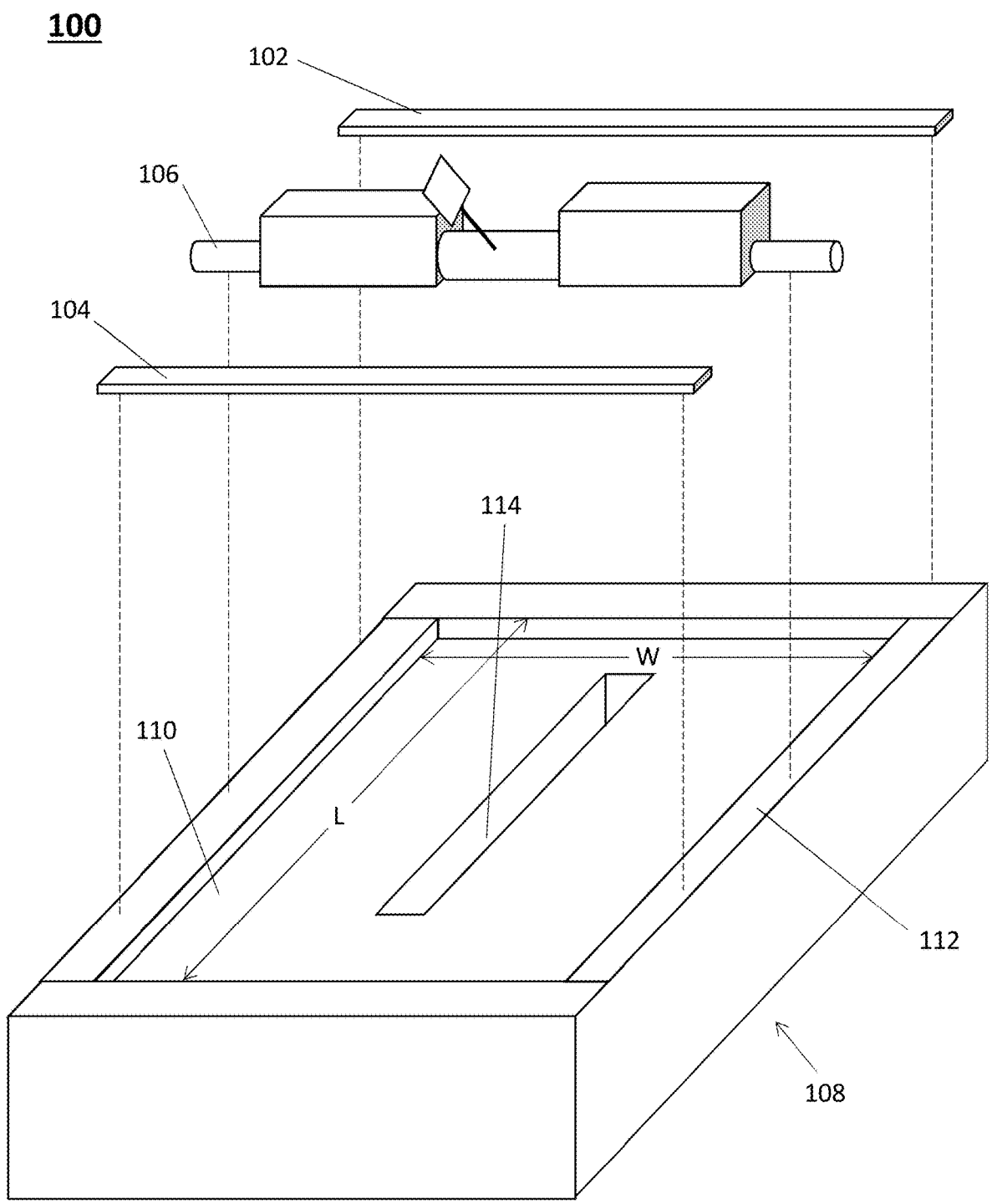
FIG. 1a is an exploded view of an LB trough having two compressions barriers and middle barrier between the two transverse compression barriers, according to some embodiments of the present invention.
Figure 1B:
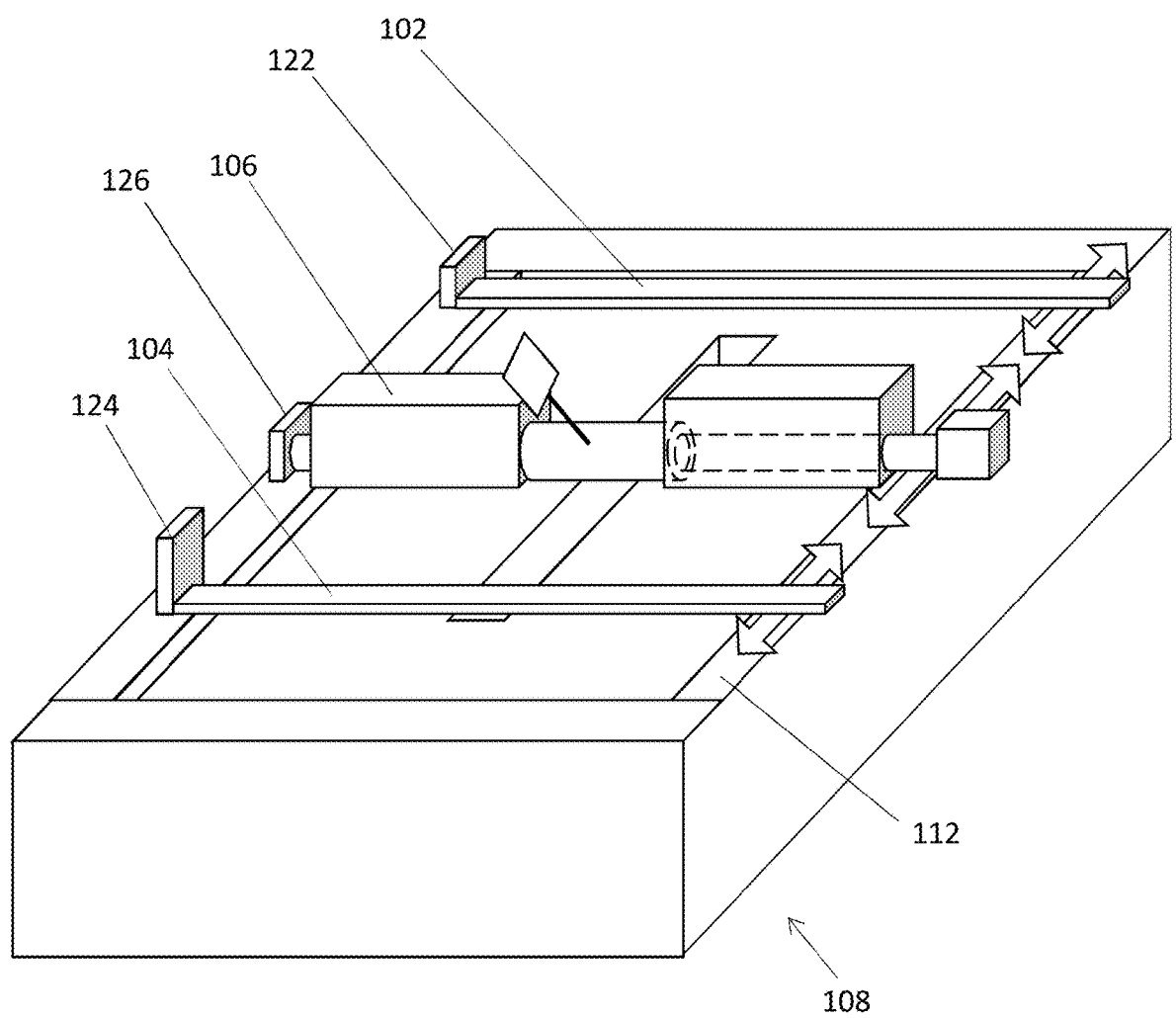
Figure 2A:
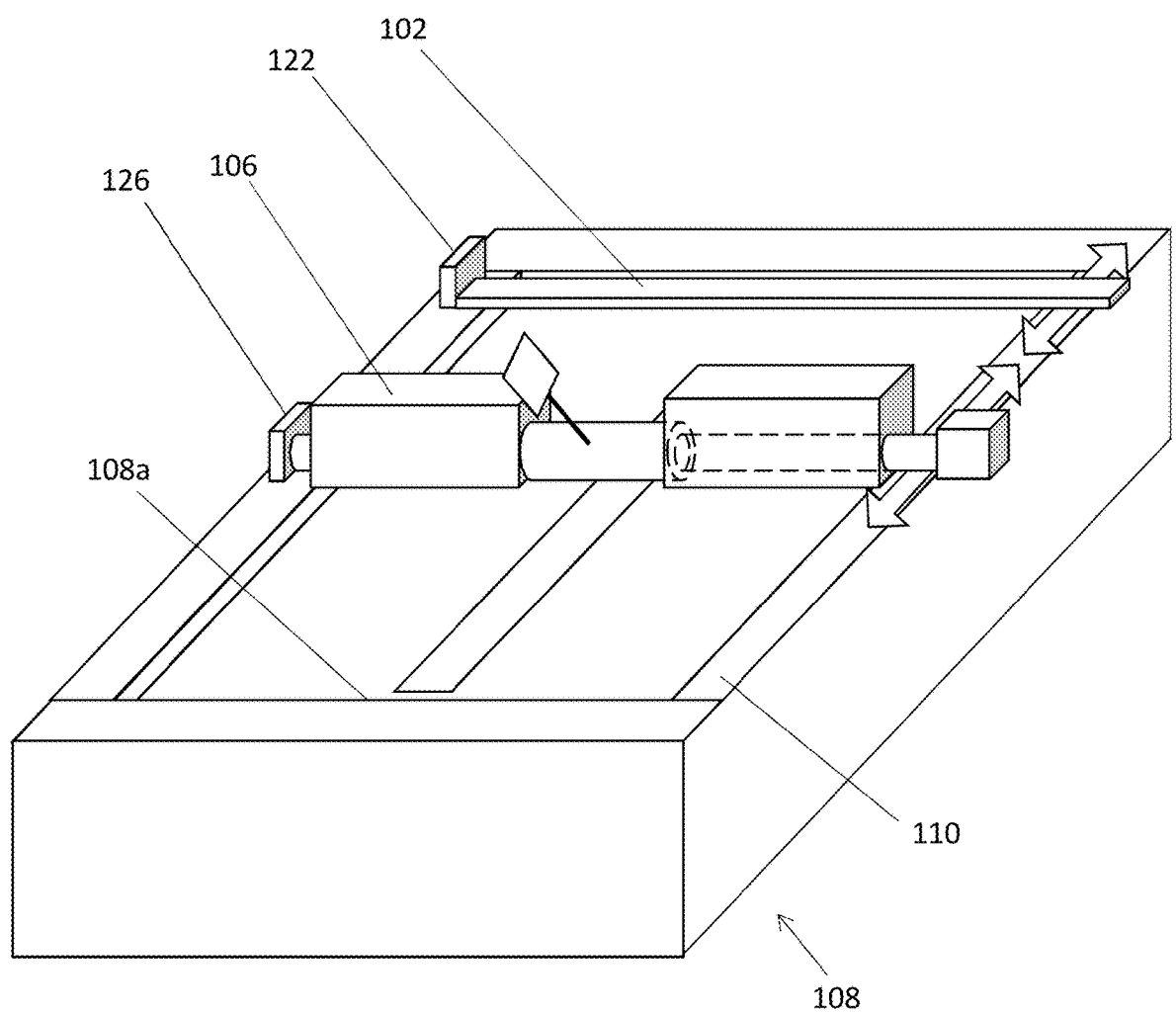
FIG. 2a illustrates an LB trough having a transverse compression barrier and a middle barrier, according to some embodiments of the present invention.

FIG. 1a is an exploded view of an LB trough 100 having two compressions barriers 102 and 104 and middle barrier 106 between the two transverse compression barriers, according to some embodiments of the present invention. FIG. 2a is an isometric view of the LB trough 100 of FIG. 1.

The LB trough 100 includes a trough base 108, a first transverse compression barrier 102, a second transverse compression barrier 104, and a middle barrier 106 located between the transverse compression barriers 102 and 104.

The trough base 108 is configured for containing a subphase liquid. In some embodiments of the present invention, the trough base includes a platform 110 elevated with respect to the bottom of the base. The platform 110 is in contact with and surrounded by a rim 112 raised with respect to the platform. The area surrounded by the rim 112 has a width W and a length L. Therefore, when the subphase liquid is in the trough base 108, the surface of the subphase liquid has width W and length L. The platform 110 has a dipping well 114 configured for enabling a substrate to be fully dipped into the subphase liquid.

Figure 2B:
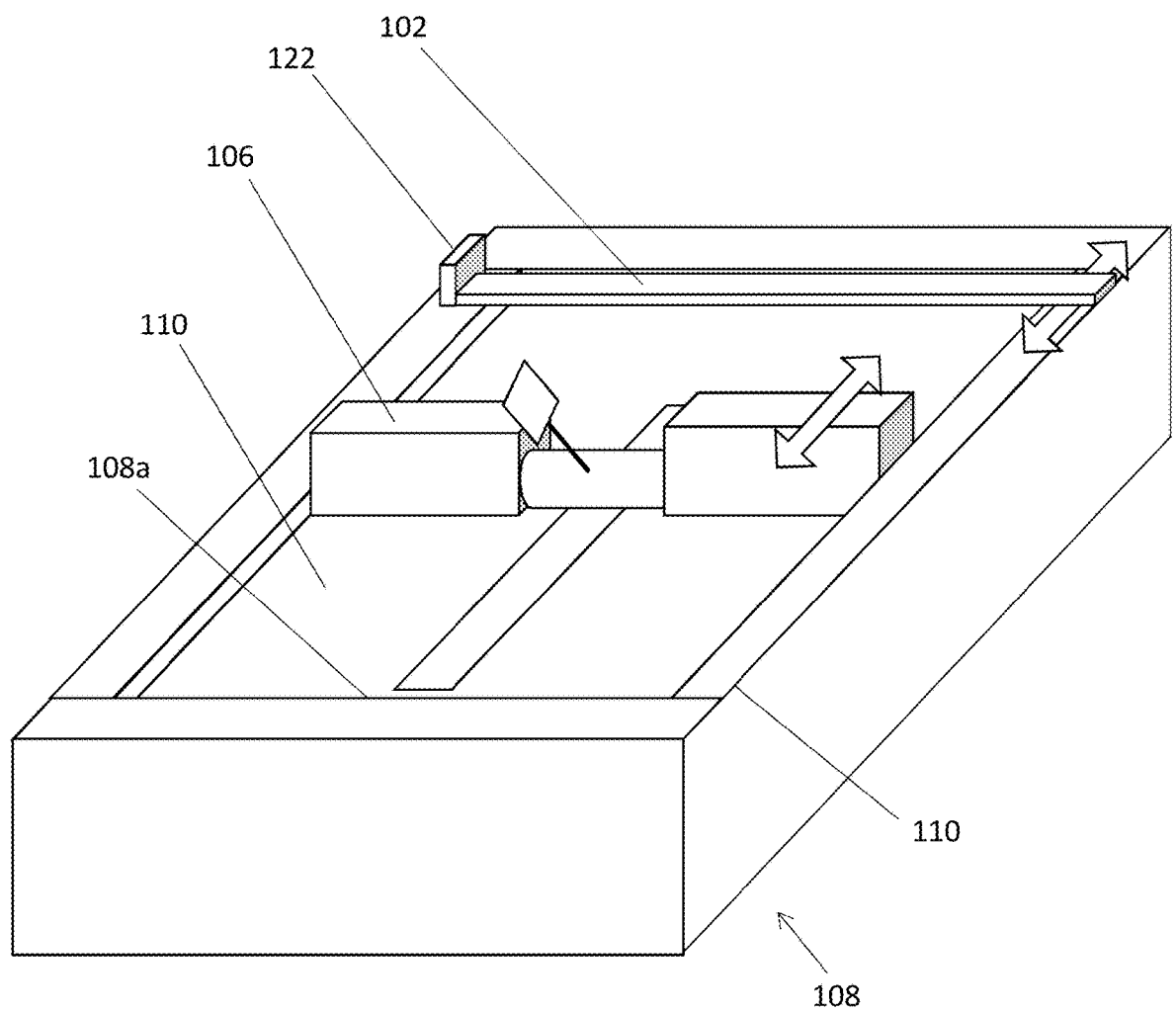
FIG. 2b illustrates an LB trough in which the middle barrier is disposed on the platform.

The first barrier 102 and the second barrier 104 extend along a first axis and a second axis, respectively, and are configured for sliding along a first motion axis and a second motion axis, respectively. The first motion axis is at a non-zero angle with the first axis, and the second motion axis is at a non-zero angle with the second axis. In some embodiments of the present invention, the first barrier 102 and the second barrier 104 are parallel to each other and the width W and are configured to slide along the length L. The first barrier and the second barrier are configured to be placed on the rim and are supported by two opposing sides of the rim 112. The middle barrier 106 is placed between the first and second transverse compression barriers and extends along a third axis. Optionally, the third axis is parallel to the first and second axis. In some embodiments of the present invention, the middle barrier 106 is movable as well along a third motion axis. The third motion axis may be parallel to the first and second motion axes. The middle barrier 106 may be placed on the rim (as seen FIGS. 1a and 1b), or may be placed on the platform 110 (as shown in the example of FIG. 2b). The barriers 102, 104, and 106 are configured for contacting the material located on the surface of the subphase liquid and for preventing the passage of the material from one side to the other side of each barrier. For this purpose, the sections of the barriers which contact the material on the surface of the subphase liquid includes a hydrophobic coating, such as PFTE (polytetrafluoroethylene) coating. As will be shown further below, the LB trough 100 enables the formation of two different layers of material over the surface of the subphase liquid. The first layer is formed between the first transverse compression barrier 102 and the middle barrier 106, while the second layer is formed between the second transverse compression barrier 104 and the middle barrier 106. The middle barrier 106 is configured to prevent the mixing of material of the first layer and material of the second layer.

In some embodiments of the present invention, a first motion mechanism 122 is associated with the first transverse compression barrier 102, a second motion mechanism 124 is associated with the second transverse compression barrier 104. Optionally, a third motion mechanism 126 is associated with the middle barrier 106. The first motion mechanism 122 is configured to move the first transverse compression barrier 102 along the length L. The second motion mechanism 124 is configured to move the second transverse compression barrier 106 along the length L. The third motion mechanism 126 is configured to move the third motion mechanism along the length L.

FIG. 2a illustrates an embodiment of the present invention, in which the LB trough 100 includes a first transverse compression barrier 102 and a middle barrier 106. Both the first transverse compression barrier 102 and the middle barrier 106 are movable along the length L shown in FIG. 1a. In this embodiment, the LB trough us configured to create two different layers of material and control the surface of each of the two layers. The first layer is formed between the first transverse compression barrier 102 and the middle barrier 106. The surface of the first layer is controlled by the motion of the first transverse compression barrier 102 and optionally of the middle barrier 106. The second layer is formed between the middle barrier 106 and a transverse wall 108a of the base 108. The transverse wall 108a is parallel to the first transverse compression barrier 102. The middle barrier 106 is located between the transverse wall 108a and the first transverse compression barrier 102.

Figure 3:
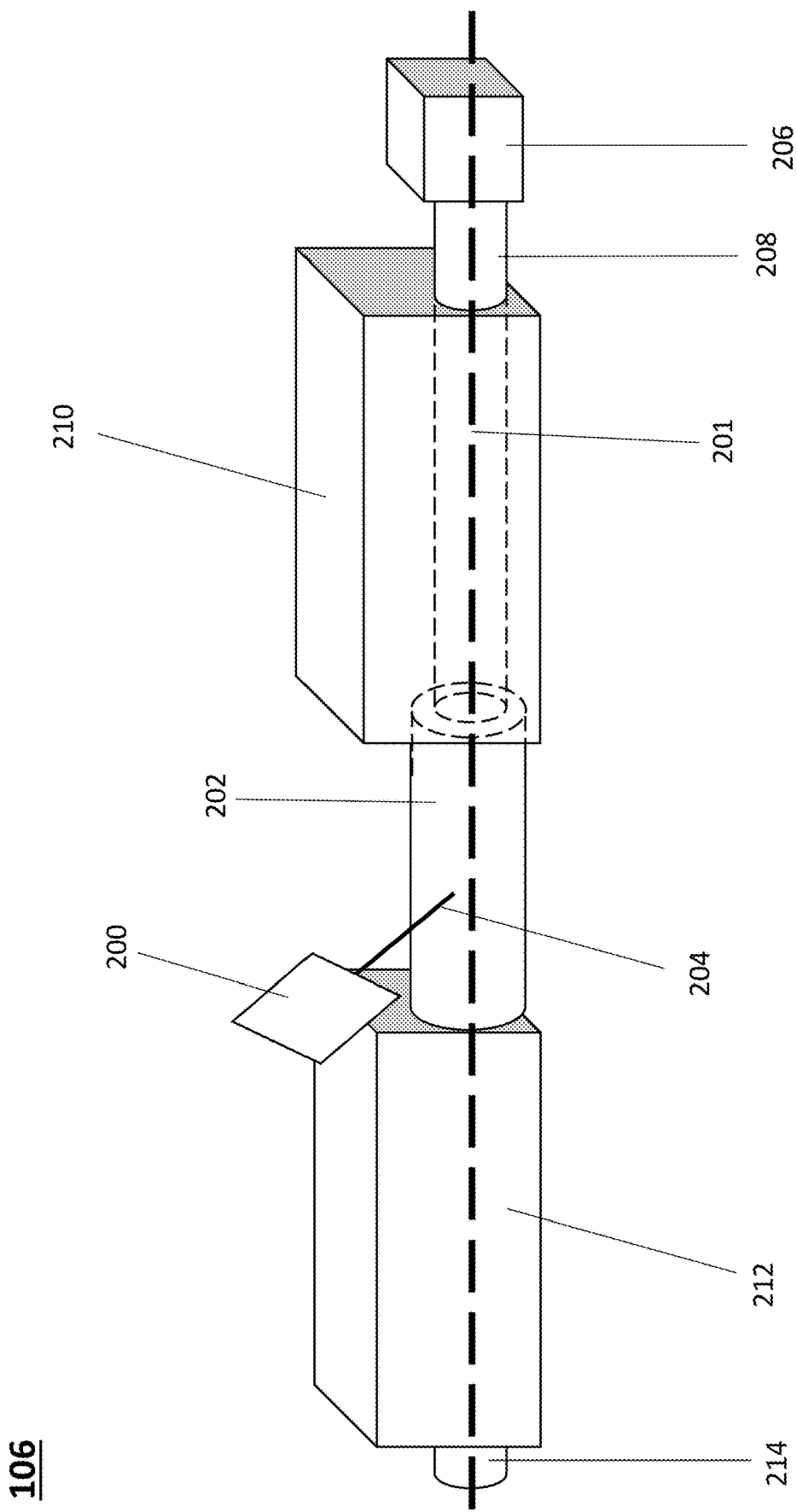
FIG. 3 is a detailed view of the middle barrier, according to some embodiments of the present invention.

FIG. 3 is a detailed view of the middle barrier 106, according to some embodiments of the present invention.

In some embodiments of the present invention, the middle barrier 106 is configured to hold a substrate 200 and to rotate the substrate 200, to cause the substrate 200 to be dipped into the subphase liquid via the first layer and out of the subphase liquid via the second layer. In this manner, the substrate can be coated with both the first and second layer via simple rotation.

According to some embodiments of the present invention, the middle barrier 106 has an elongated shape and comprises a rotatable section 202 and a holder 204 extending outward from the rotatable section 204 and configured to rotate with the rotatable section 202. The holder 204 is configured for holding the substrate 200. The rotatable section may be rotated by a motor 206. The rotatable section may rotate around a rotation axis which is parallel to or the same as the third axis 201 along which the middle barrier 106 extends. In a variant of the present invention, the rotatable section 202 is configured to rotate in a single direction (e.g., clockwise) around a rotation axis. In another variant of the present invention, the rotatable section 202 is rotatable in both directions (clockwise and counterclockwise) around the rotation axis. In this manner, the direction of rotation may be changed as needed. This may be useful, for example, to dip a substrate into a layer multiple times, to obtain a desired level of coating.

In some embodiments of the present invention, the middle barrier includes, from a first end to a second end of the middle barrier, a motor 206, a motor shaft 208, a distal section 210, the rotatable section 202, a proximal section 212, and a support section 214.

The motor shaft 208 is configured to be rotated by the motor 206 joined to a distal end of the motor shaft 208. A first portion of the motor shaft is configured for being supported by a first side of the rim of the trough base described above. A second portion of the motor shaft 208 traverses a distal section 210, which may rotate with the motor shaft 208 in a manner in which the rotation of the motor shaft 208 does not cause the distal section to rotate. The proximal end of the motor shaft is joined to the rotatable section 202 located at the proximal end of the distal section 210. The rotatable section 202 is rotated by the rotation of the motor shaft 208. Optionally, the rotatable section is thicker than the motor shaft 208, to ensure that the rotatable section is partially submerged in the subphase liquid when the subphase liquid fills the trough base to the brim.

A proximal section 212 is joined to the proximal end of the rotatable section 202, and may be rotated with the rotatable section 202 or be joined to the rotatable section 202 in a manner that prevents the rotation of the proximal section when the rotatable section 202 rotates. A support section 214 is joined to the proximal end of the proximal section 214 and is configured to be supported by a second side of the rim of the trough base described above.

In some embodiments of the present invention, the distal section 210 and the proximal section 212 are partially submerged in the subphase liquid when the subphase liquid fills the trough base to the brim.

Figure 4:
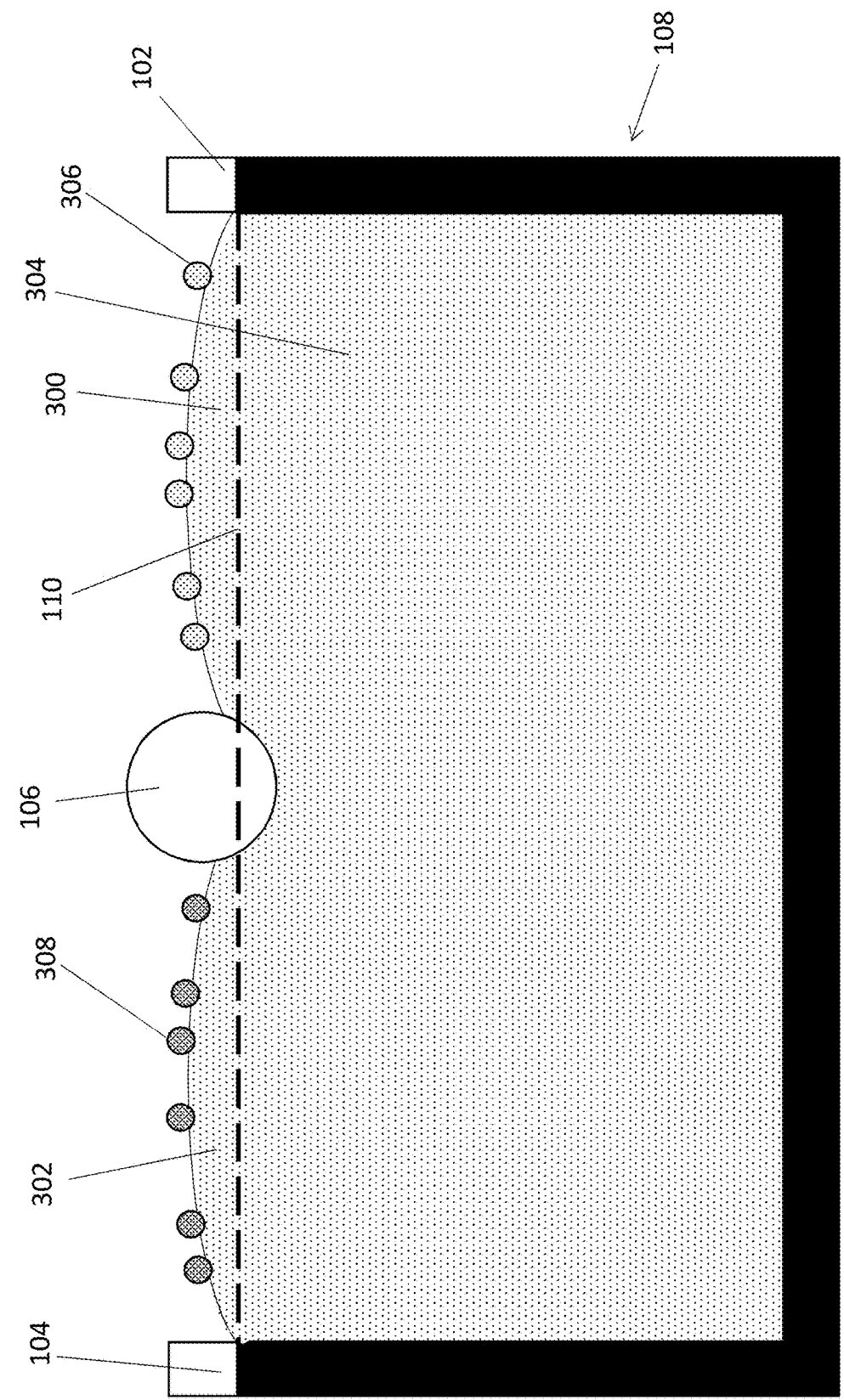
FIGS. 4-6 are cross-sectional side views of an LB trough of the present invention having two transverse compression barriers and a middle barrier, in which two layers are formed on the surface of a subphase liquid by translation of the transverse compression barriers.
Figure 5:
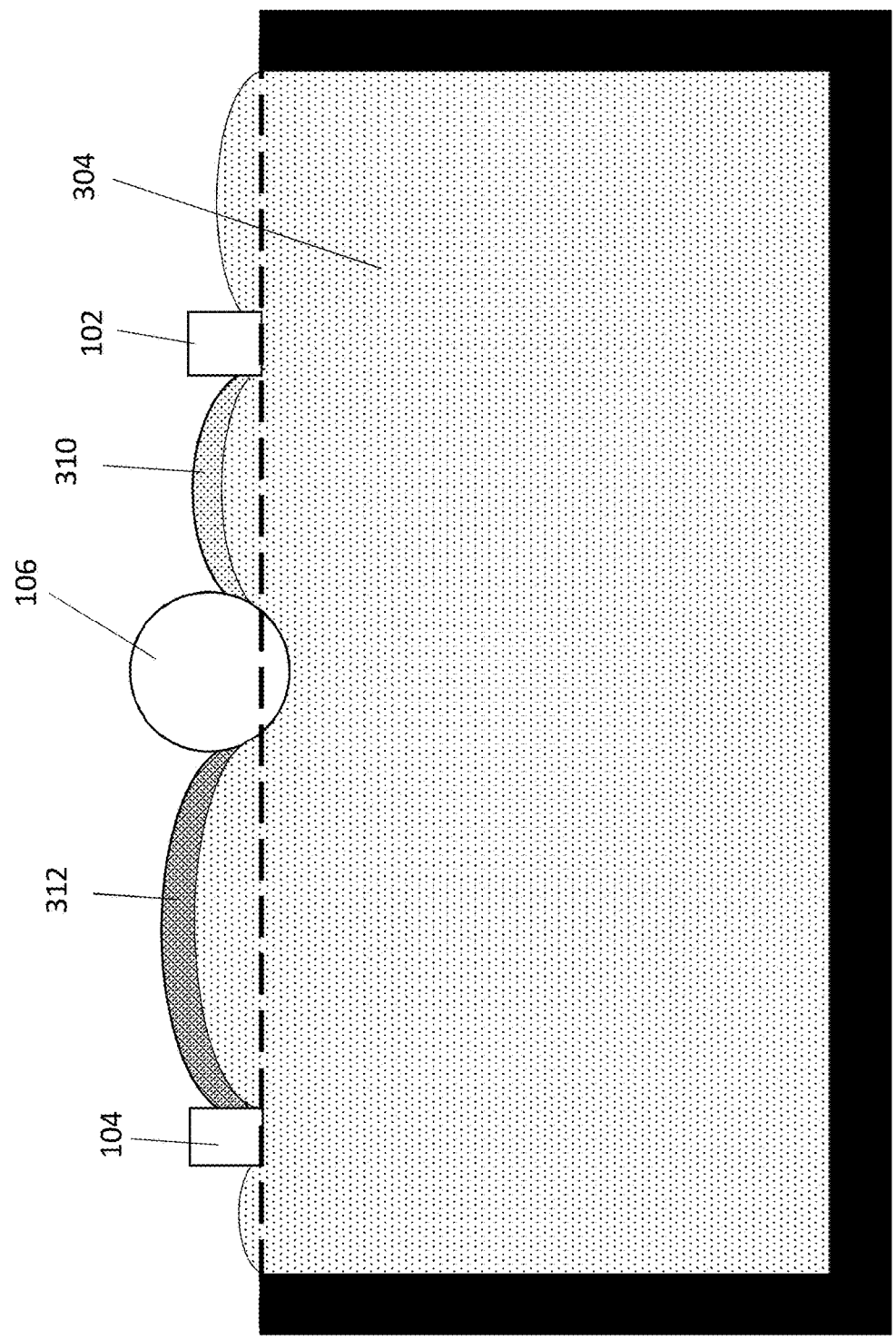
Figure 6:
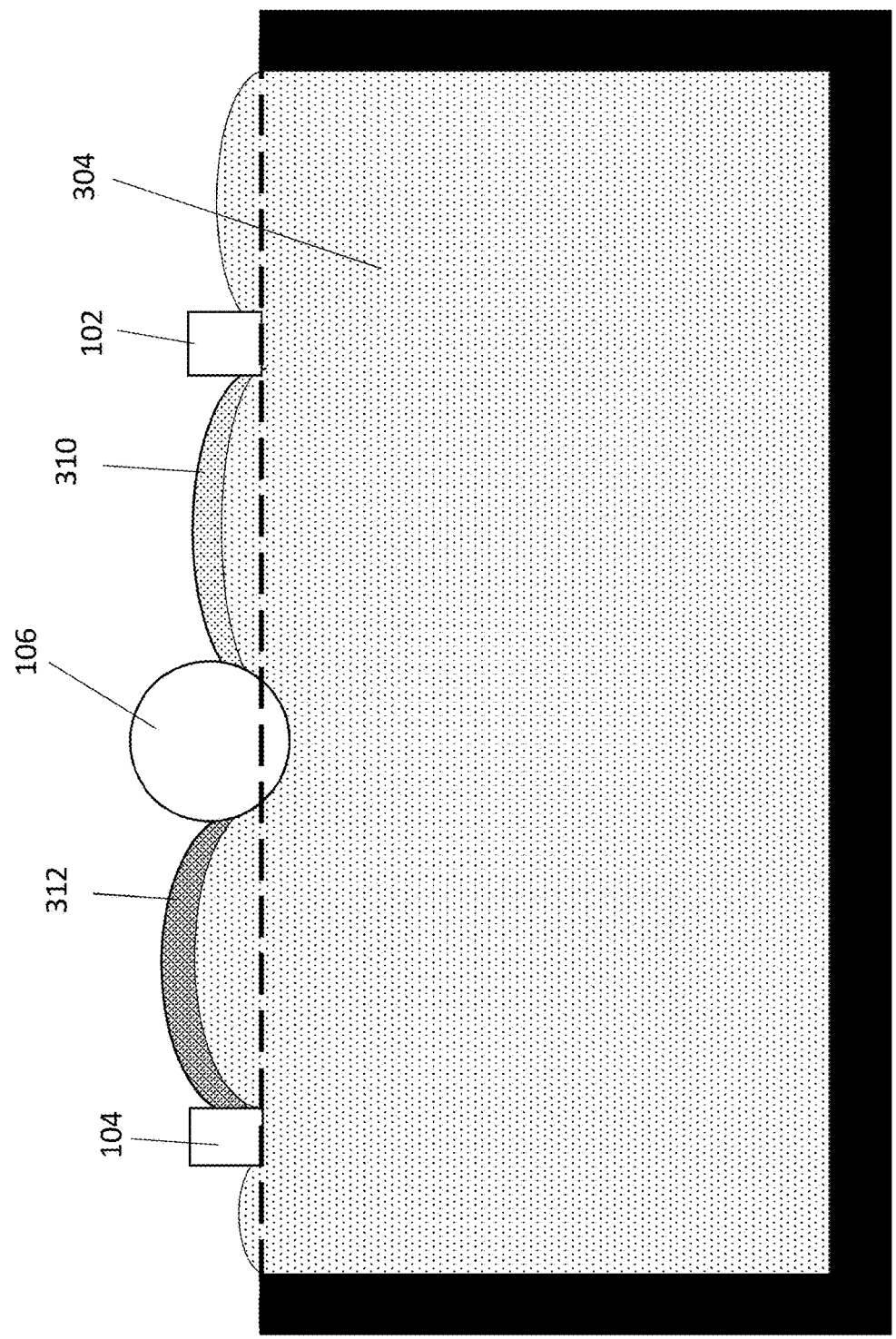

FIGS. 4-6 are cross-sectional side views of the LB trough 100 of the present invention, in which two layers 310 and 312 are formed by translation of the transverse compression barriers 102 and 104, and optionally via the translation of the middle barrier 106 as well.

In FIG. 4, the subphase liquid 304 fills the trough base 108 to the brim. In this manner a first meniscus 300 and a second meniscus 302 of the subphase liquid are formed above the rim 110 of the trough base 108, due to the surface tension of the subphase liquid 304. The first meniscus 300 is between the first transverse compression barrier 102 and the middle barrier 106. The second meniscus 302 is between the second transverse compression barrier 104 and the middle barrier 106.

First particles 306 of a first material are spread over the surface of the first meniscus 300 and float on the surface of the first meniscus 300. Second particles 308 of a second material are spread over the surface of the first meniscus 300 and float on the surface of the first meniscus 300. The first and second material may be different materials or the same material.

The first transverse compression barrier 102 and the second transverse compression barrier 104 are located on the rim of the trough base. In FIG. 5, the first transverse compression barrier 102 is moved toward the middle barrier 106 and pushes the first particles together until the particles of the first material form a first layer 310. Subphase liquid 304 passes below the first transverse compression barrier 102, as the surface upon which the first material is located decreases.

The second transverse compression barrier 104 is moved toward the middle barrier 106 and pushes the second particles together until the particles of the second material form a second layer 312. Subphase liquid 304 passes below the first transverse compression barrier 102, as the surface upon which the first material is located decreases. In this manner, respective layers are formed on the subphase liquid 304 on respective sides of the middle barrier 106. The first and second layers 310 and 312 may be in the form of monolayers or films of amphiphilic molecules, polymers, nanoparticles, biomaterials, as needed.

In some embodiments of the present invention, as seen in FIG. 6, the middle barrier 106 is also configured to be moved to adjust the surfaces of the first layer 310 and the second layer 312.

Figure 7A:
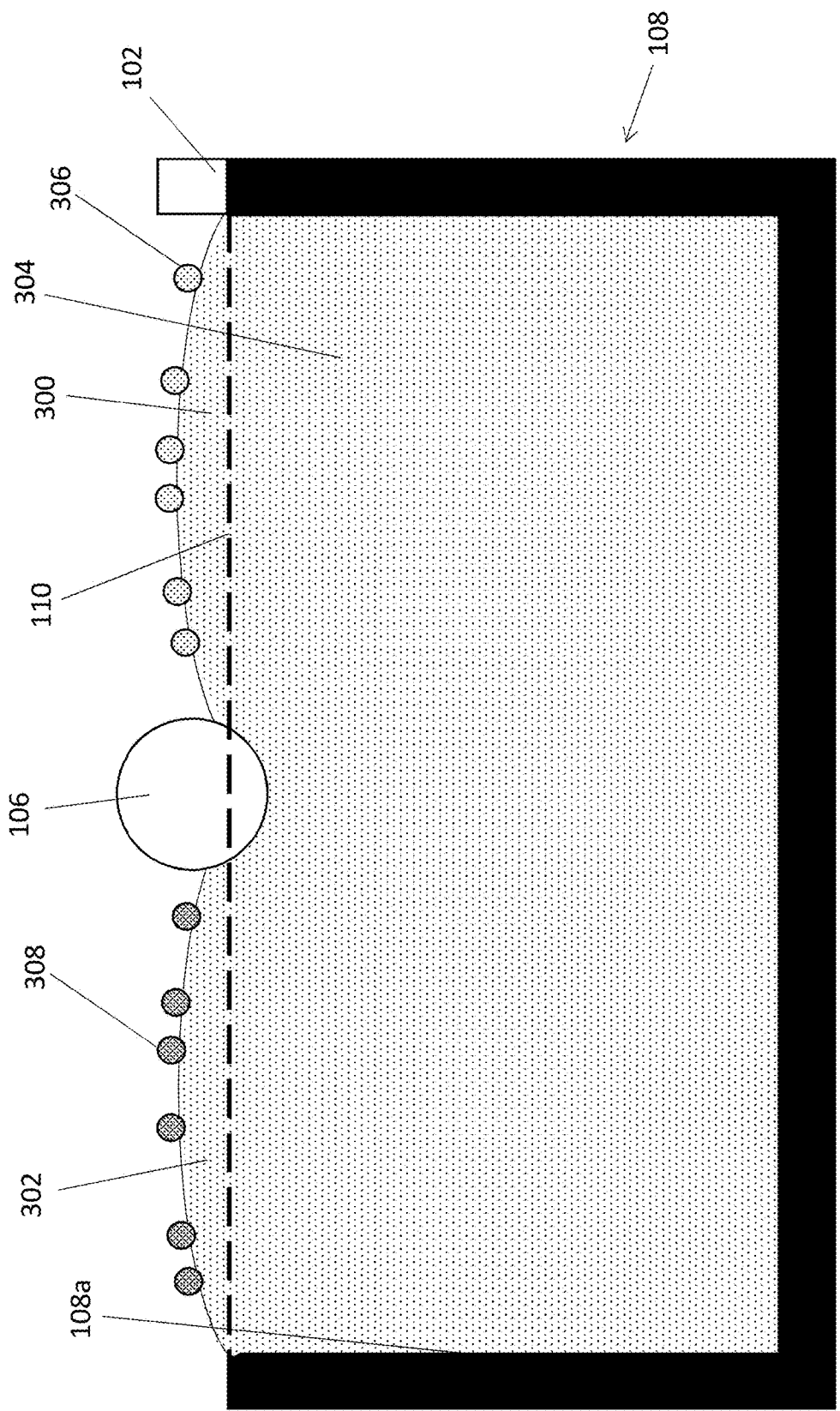
FIGS. 7a and 7b are cross-sectional side view of an LB trough of the present invention having one transverse compression barrier and a middle barrier, in which two layers are formed on the surface of a subphase liquid via the translation of the transverse compression barrier and the middle barrier.
Figure 7B:
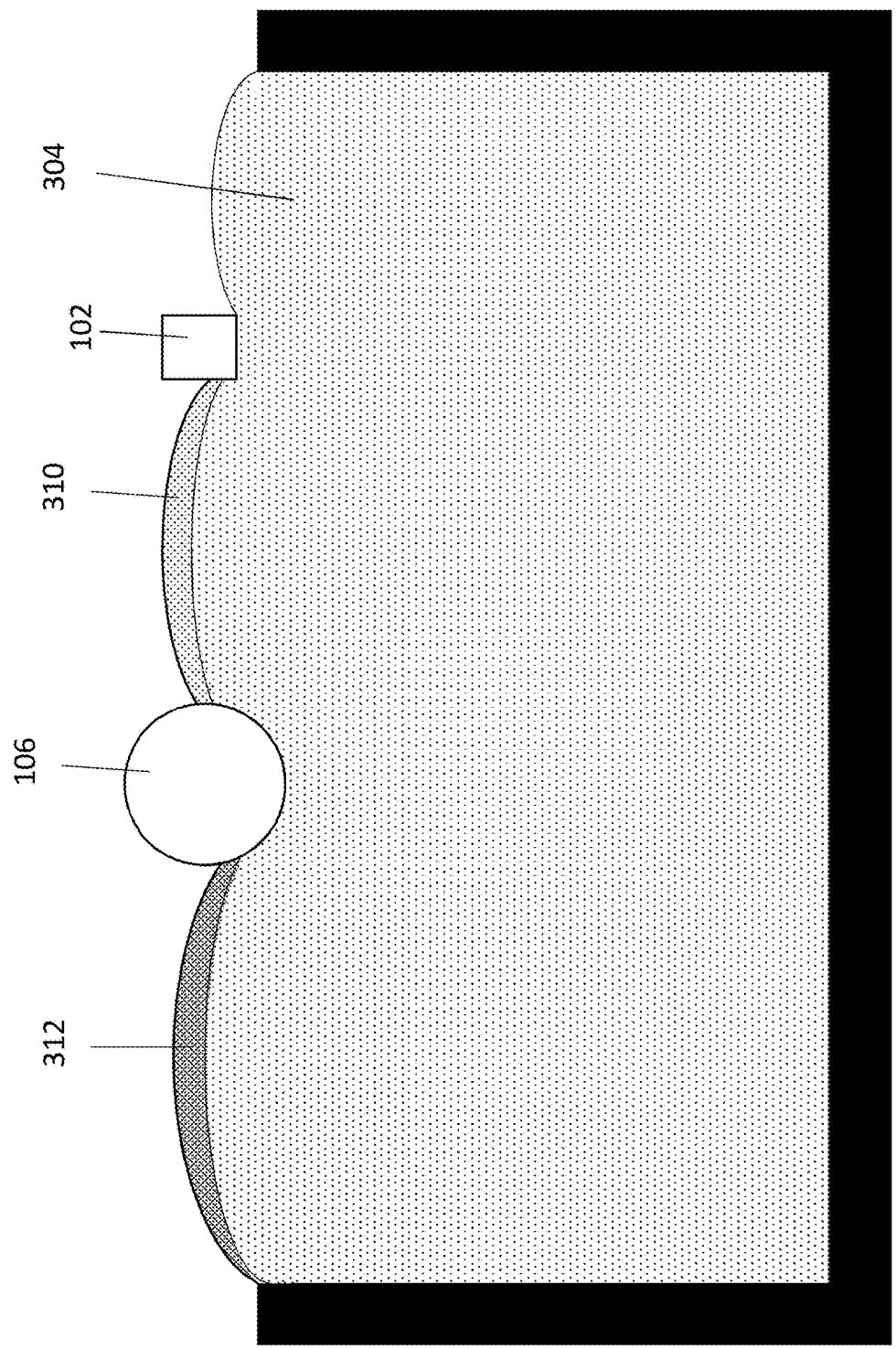

FIGS. 7a and 7b are cross-sectional side views of an LB trough of the present invention having one transverse compression barrier and a middle barrier, in which two layers of material are formed over a subphase liquid, via the movement of the transverse compression barrier and the middle barrier.

FIG. 7a is similar to FIG. 4, with the difference that in FIG. 7a the second transverse compression barrier is absent. The second particles are therefore spread over a surface of the second meniscus 302 that is located between the transverse wall 108a of the trough base 108.

In FIG. 7b, the middle barrier 106 is moved toward the transverse wall 108 and pushes the second particles together to form a second layer 312. Then the first transverse compression barrier 102 is pushed toward the middle barrier and pushes the first particles together to form a first layer 310. Respective layers are formed on the subphase liquid 304 on respective sides of the middle barrier 106.

FIGS. 8-14 are cross sectional side view of the LB trough 100 of the present invention, in which a substrate 200 joined to the rotatable portion of the middle barrier 106 is dipped into both layers 310 and 312 floating on the subphase liquid 304, via the rotation of the rotatable portion of the middle barrier 106.

Figure 8:
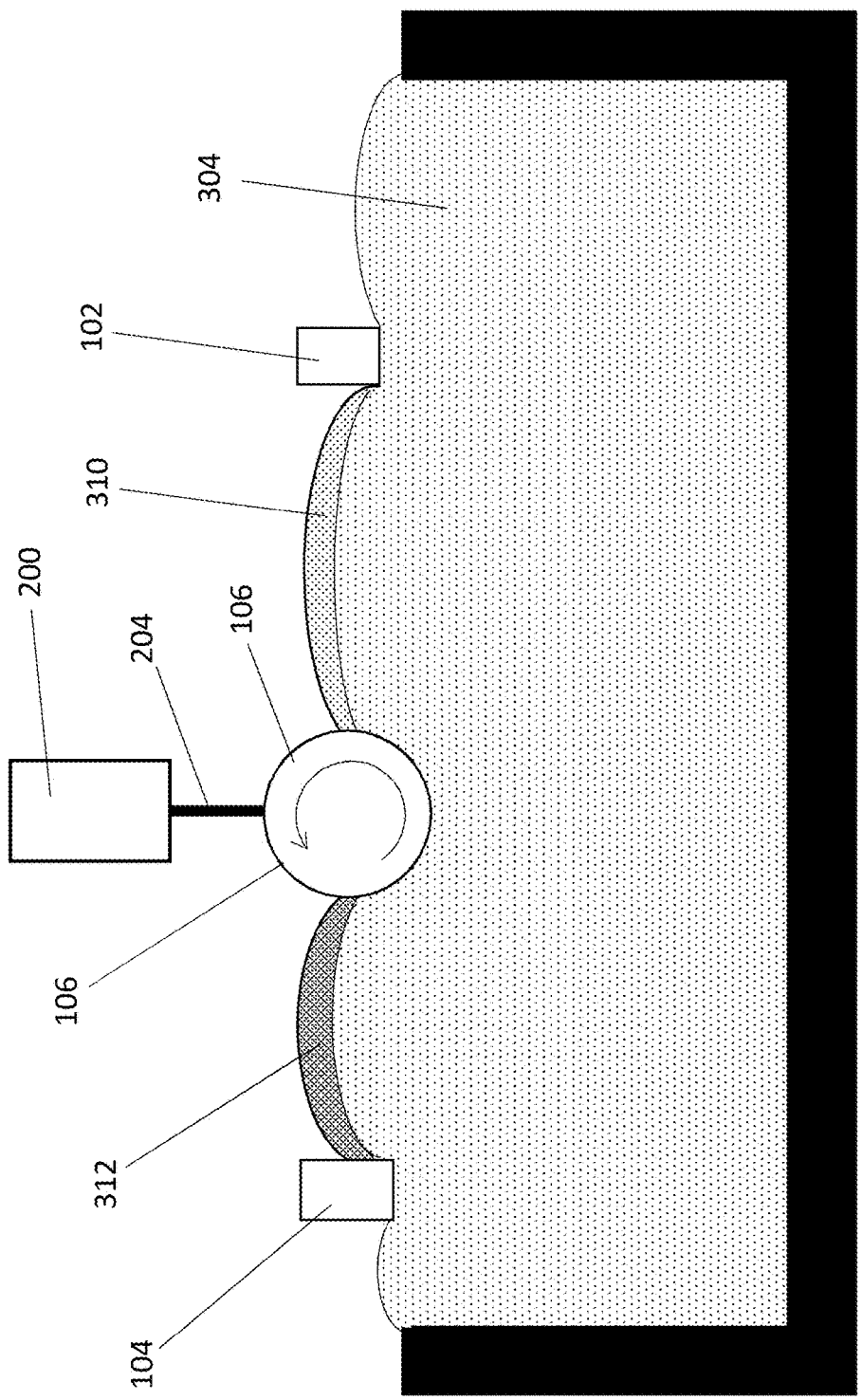
FIGS. 8-14 are cross sectional side view of the LB trough of the present invention, in which a substrate joined to the rotatable portion of the middle barrier is dipped into both layers floating on the subphase liquid via the rotation of the rotatable portion of the middle barrier.

In FIG. 8, the first layer 310 and the second layer 312 have been formed on respective sides of the middle barrier 106, as explained above in the description of FIGS. 4-7b. A substrate 200 is joined to the rotatable portion of the middle barrier 106 via a holder 204, as explained above in the description of FIG. 3.

Figure 9:
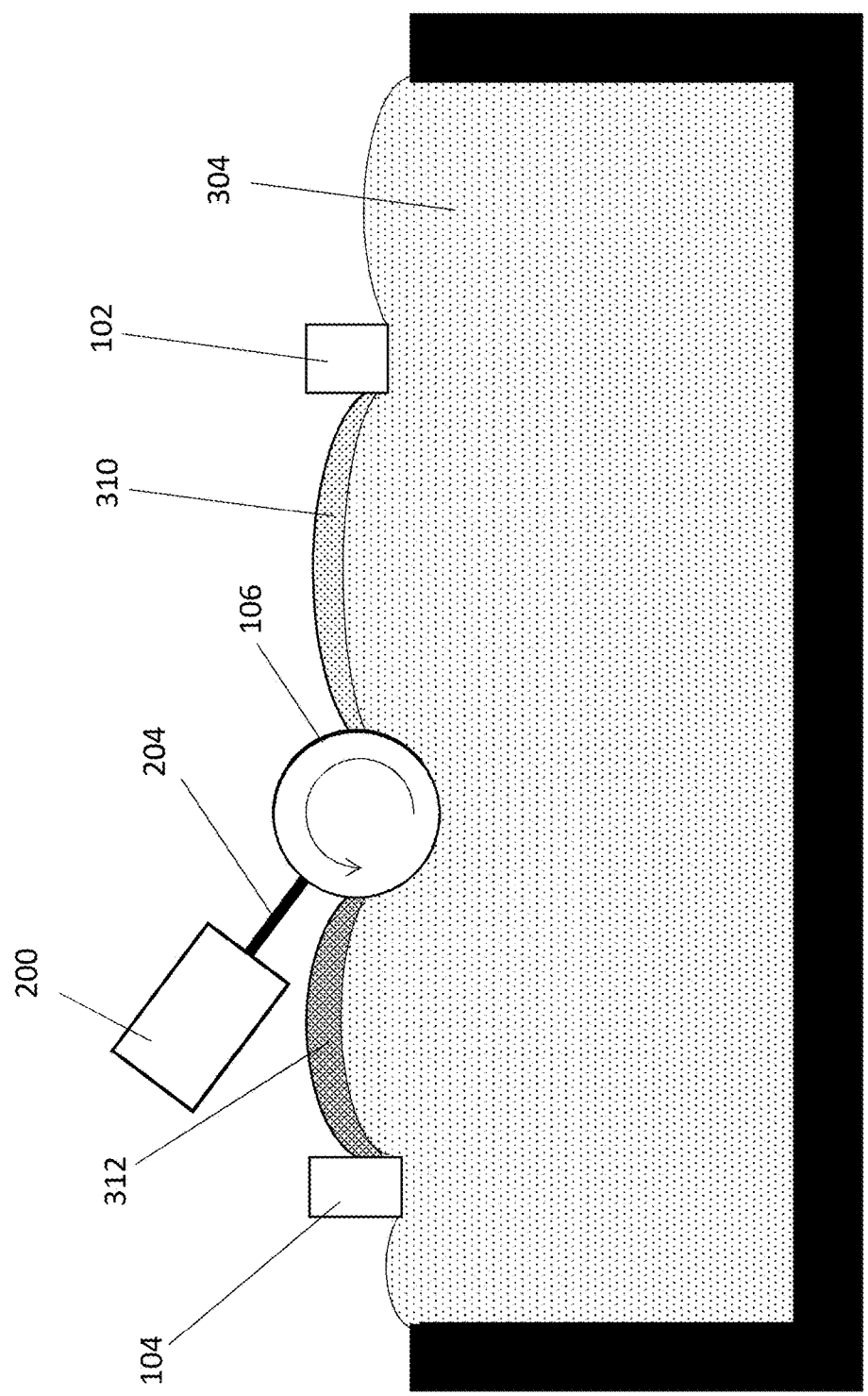

In FIG. 9, the rotatable portion of the middle barrier 106 starts rotating in a first direction (in this case counterclockwise, but the direction may be clockwise). With the rotation of the rotatable portion of the middle barrier, the substrate 200 is rotated as well.

Figure 10:
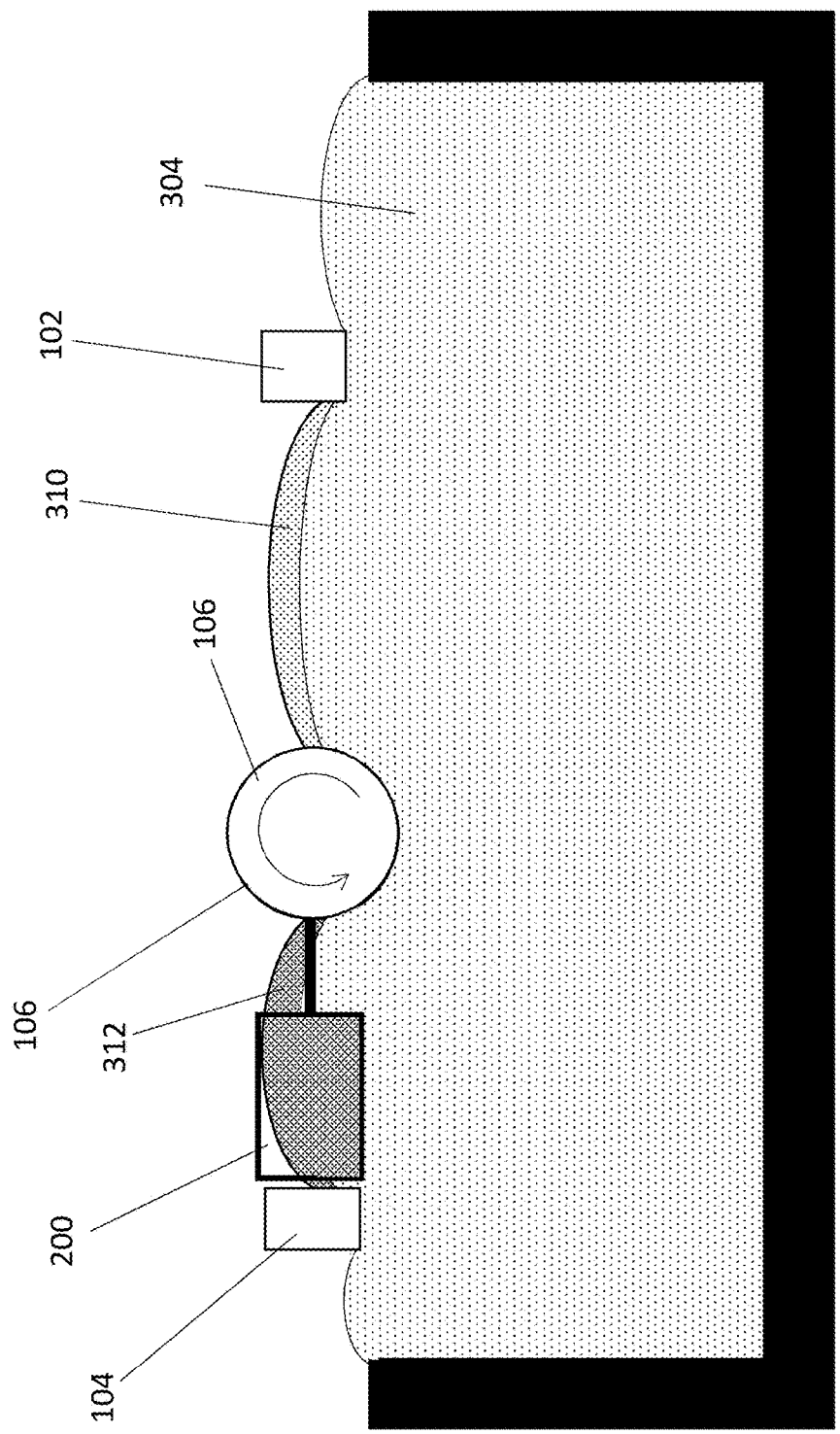

In FIG. 10, the substrate 200 is being dipped into the subphase liquid 304 via the second layer 312. Optionally, the substrate 200 is a thin, flat piece of material extending along a plane and is dipped into the subphase liquid such that the plane of the substrate 200 is perpendicular to the surface of the subphase liquid. As the substrate 200 passes through the second layer 312, particles in the second layer bond to the substrate 200, as is known in LB deposition techniques. In FIG. 10, a first section of the substrate 200 has passed through the second layer 312, while a second section of the substrate has not yet passed through the second layer 312. Particles of the second layer 312 have bonded with the first section of the substrate 200 that has passed through the second layer 312.

Figure 11:
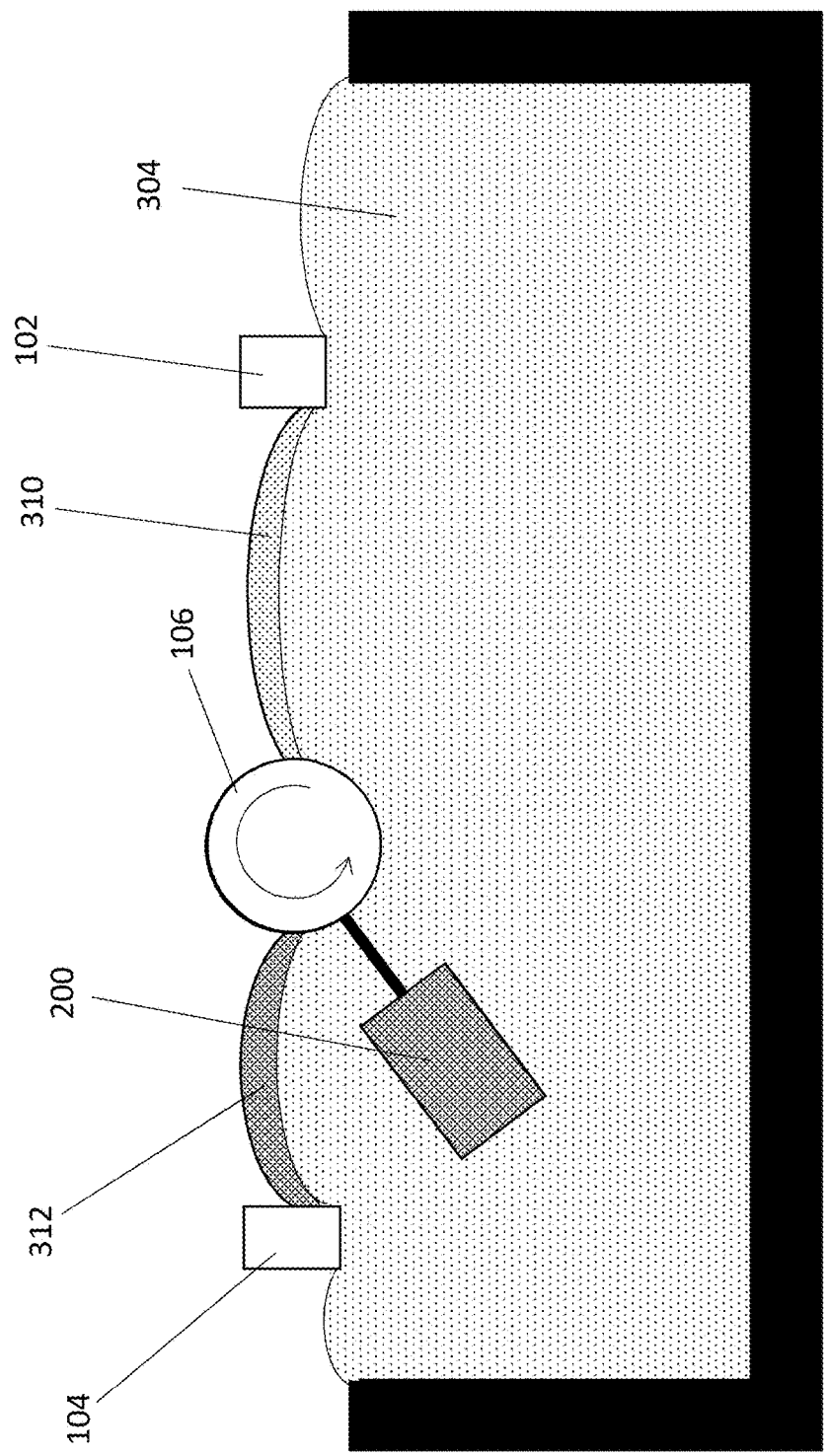
Figure 12:
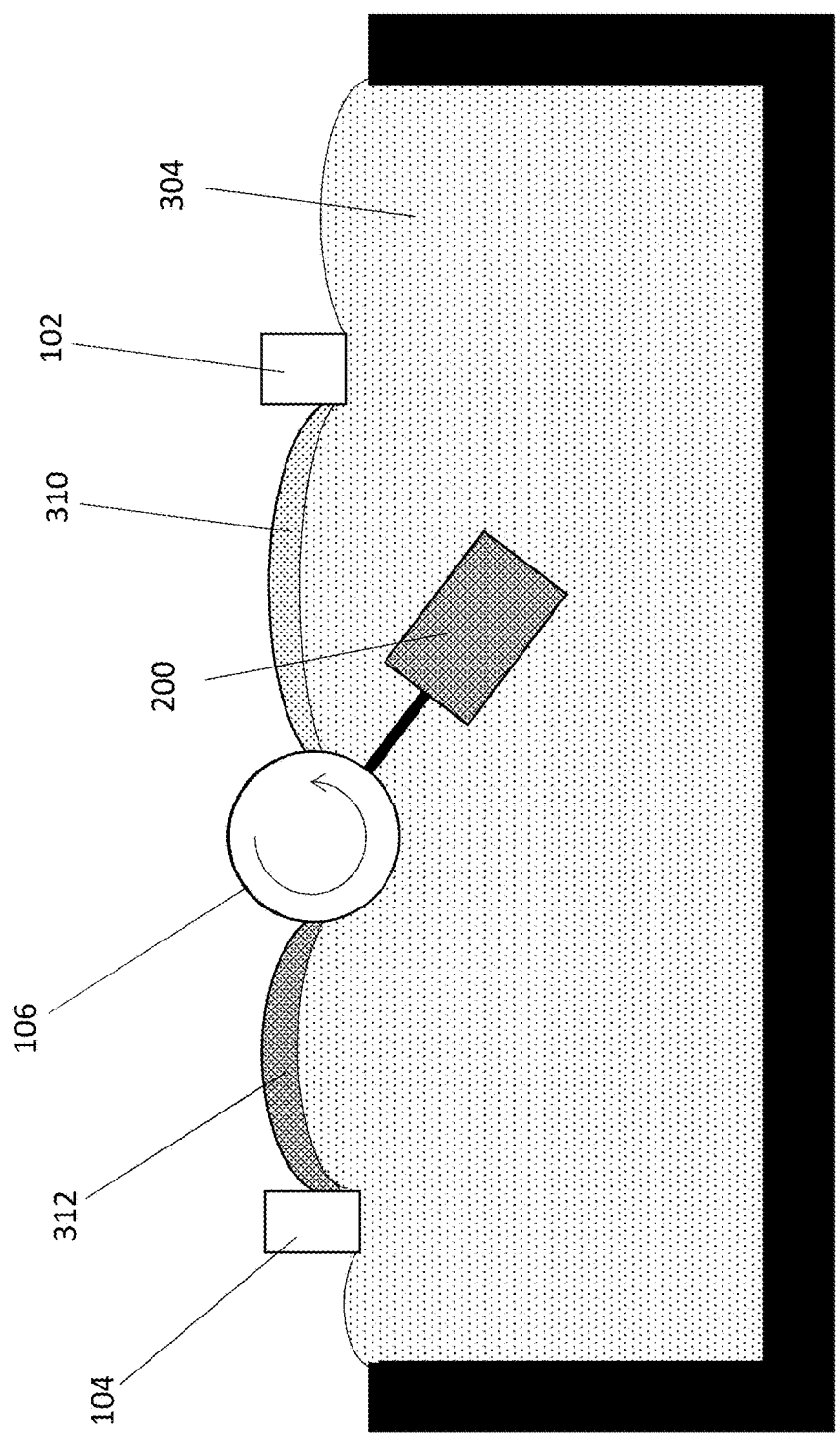

In FIG. 11, the rotation of the rotatable portion 106 and of the substrate 200 continues. The whole substrate is inside the subphase liquid and coated by of material of the second layer 312. In FIG. 12, the rotation of the rotatable portion 106 continues and the substrate 200 approaches the first layer 310.

Figure 13:
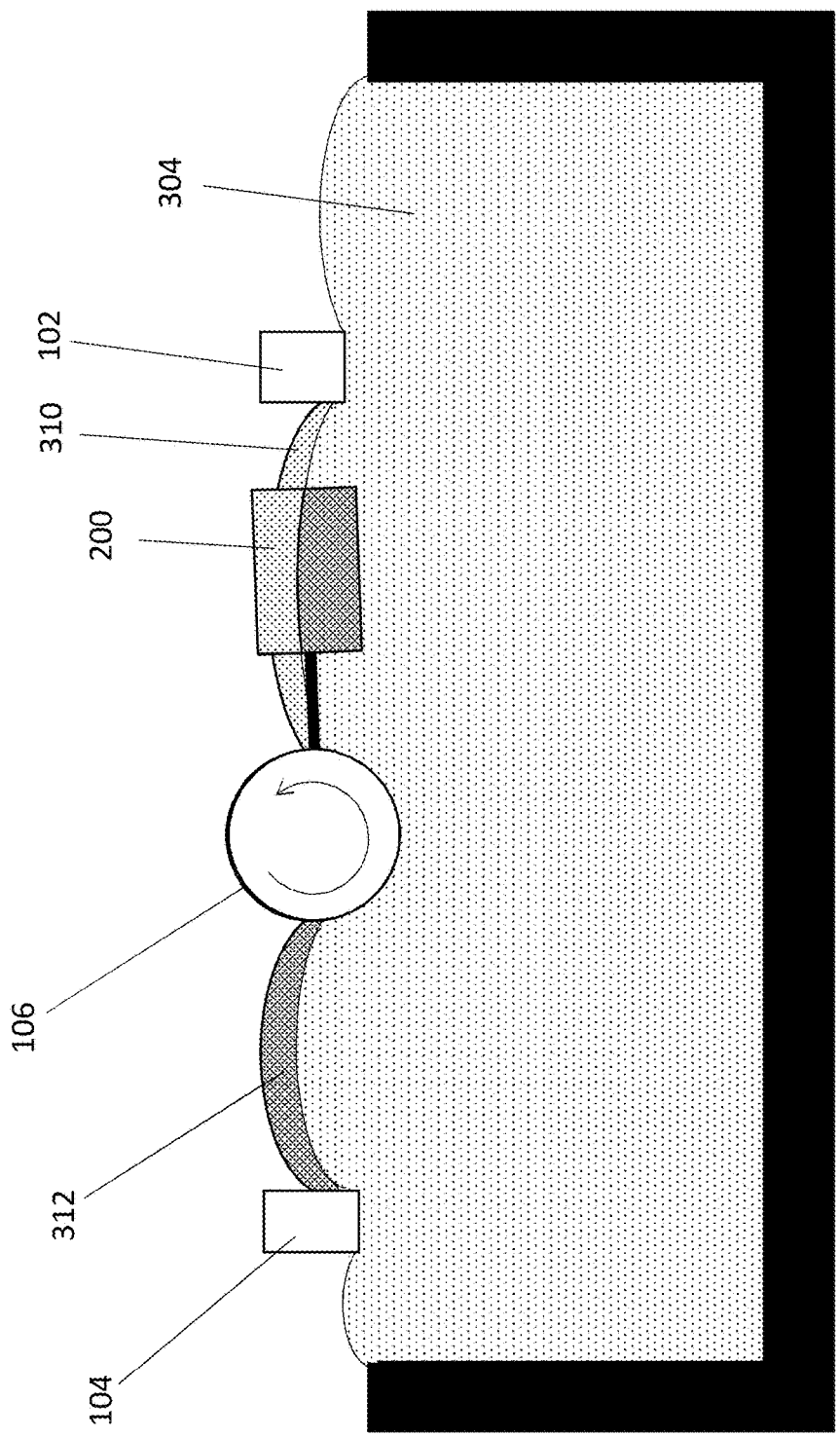
Figure 14:
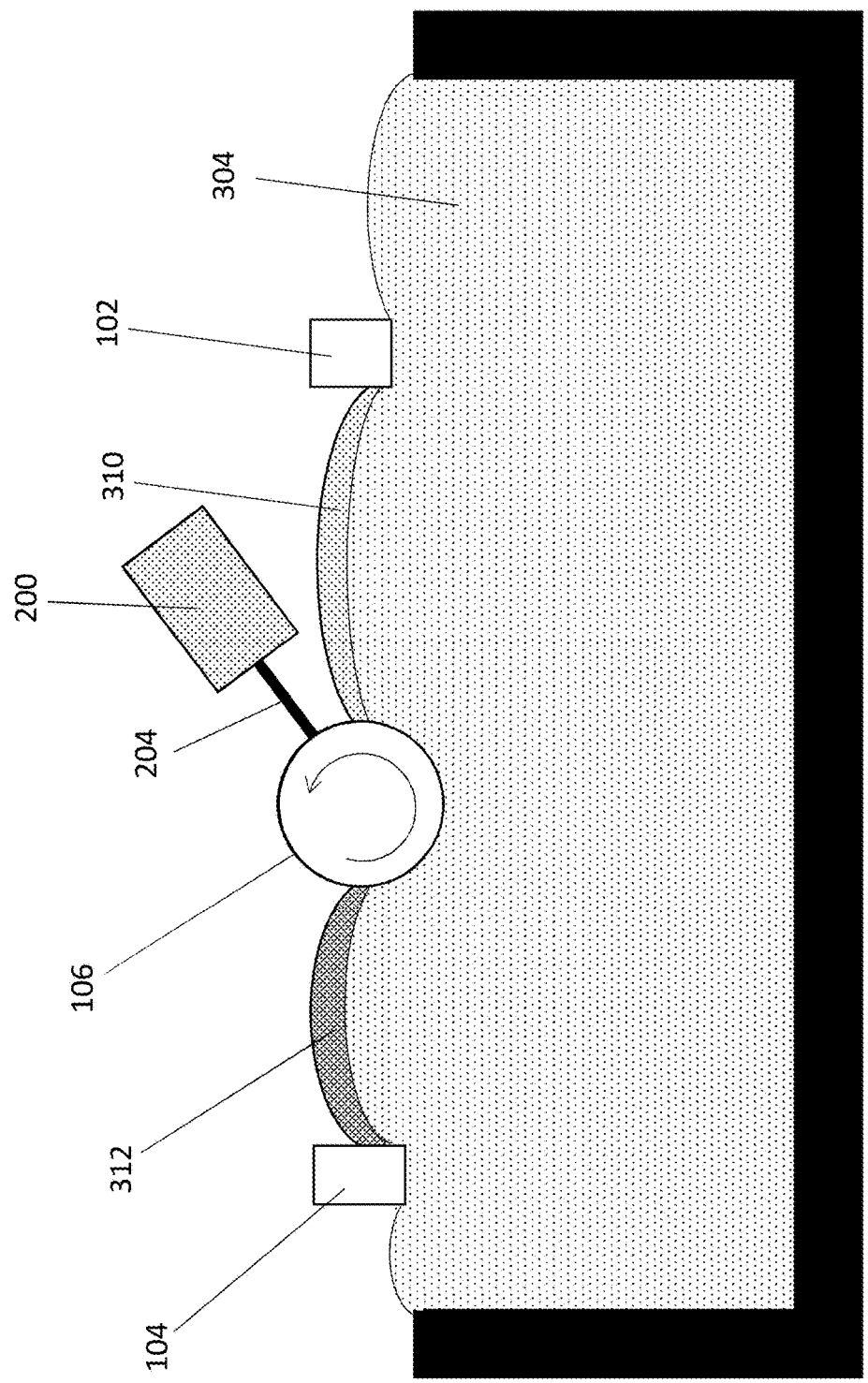

In FIG. 13, the substrate 200 starts to emerge out of the subphase liquid 304 via the first layer 310. As the substrate 200 passes through the first layer 310, particles of the first layer coat with the substrate 200. In FIG. 14, the substrate 200 has fully emerged from the subphase liquid 304 and is coated with material from the first layer 310.

Figure 15:
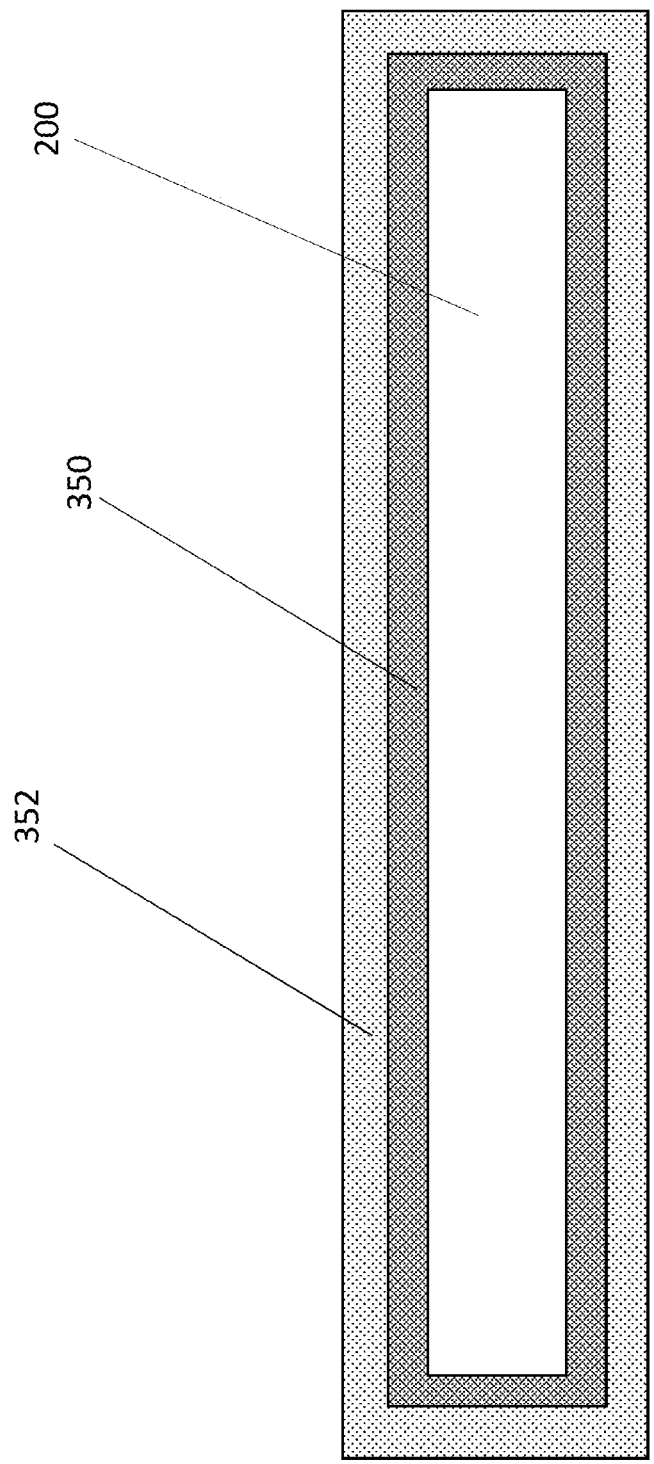
FIG. 15 is a cross section of the substrate coated with two different coatings, after the substrate 200 has passed through the first and second layers of FIGS. 8-14.

FIG. 15 is a cross section of the substrate 200, after the substrate 200 has passed through the first and second layers of FIGS. 8-14. The substrate 200 is coated by two coatings. The inner coating 350 is bonded to the substrate 200 and includes particles from the second layer 312 of FIGS. 8-14. The outer coating 352 is bonded to the inner coating 350 and includes particles from the first layer 310 of FIGS. 8-14.

It should be noted that while in the example of FIGS. 8-14, the rotatable section of the middle barrier rotates in a single direction (counterclockwise), the present invention extends to the embodiments in which the rotatable section of the middle barrier is rotatable in both directions (clockwise and counterclockwise), according to a need of the user. This may be useful, for example, for dipping the substrate into each layer of material several times, before dipping the substrate into a second layer of material. This may also be useful for dipping the substrate into each layer of material as many times as desired, while keeping the number of dippings in the first layer independent from the number of dippings in the second layer. In this manner, the coating of the substrate can be better controlled.

Some embodiments of the present invention relate to an adjustment apparatus for an LB trough having movable lateral barriers, and configured for adjusting the size and profile of a layer floating on the surface of a subphase liquid. FIGS. 16-22 relate to these embodiments of the present invention.

Figure 16:
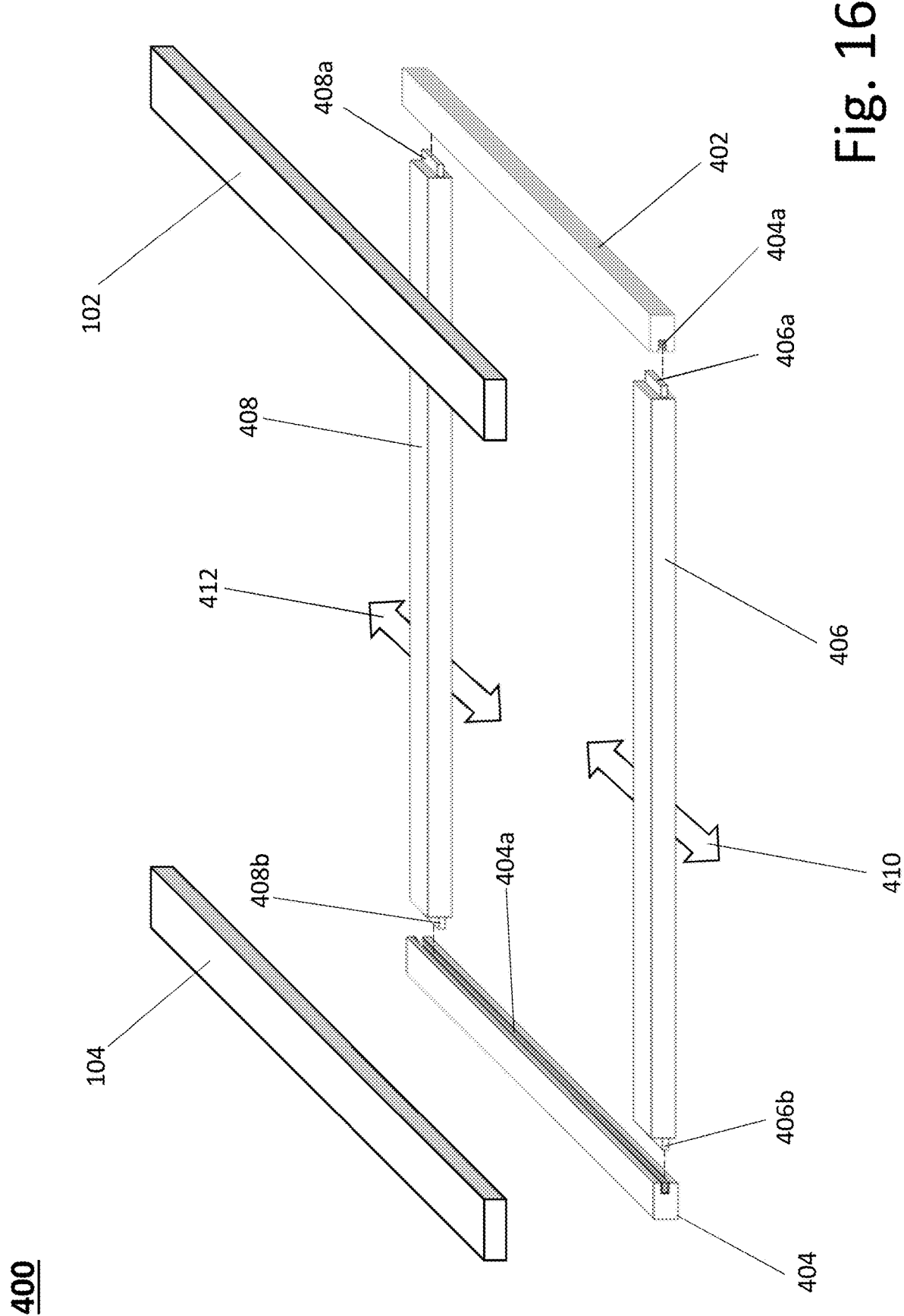
FIGS. 16-17 are respectively an exploded view and a partially exploded view of an adjustment apparatus for an LB trough configured to adjust the size and profile of a layer of material floating on the surface of a subphase liquid, according to some embodiments of the present invention.
Figure 17:
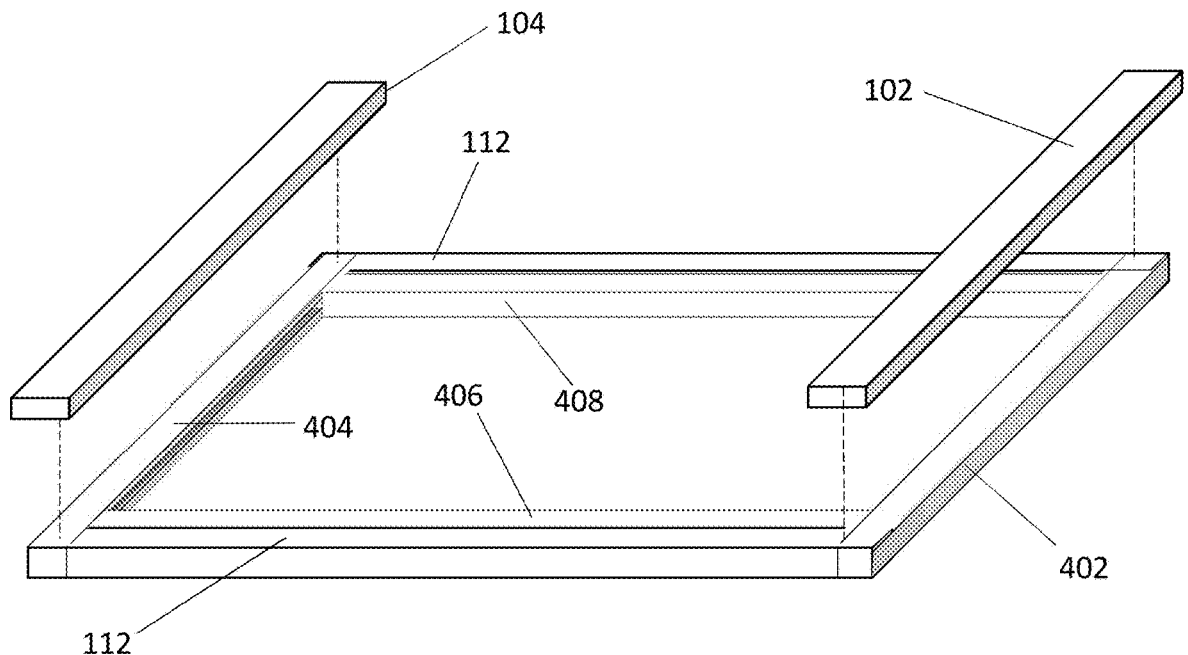

FIGS. 16-17 are respectively an exploded view and a partially exploded view of an adjustment apparatus 400 for an LB trough configured to adjust the size and profile of a layer of material floating on the surface of a subphase liquid, according to some embodiments of the present invention.

The adjustment apparatus 400 includes a first grooved edge 402, a second grooved edge 404, a first lateral barrier 406, and a second lateral barrier 408, a first transverse compression barrier 102, and optionally a second transverse compression barrier 104.

The first grooved edge 402 is an elongated beam extending along a first transverse axis and configured to be inserted in the trough base and be joined to a first transverse wall of a trough base. The second grooved edge 404 is an elongated beam extending along a second transverse axis parallel to configured to be inserted in the trough base and be joined to a second transverse wall of a trough base opposite to the first transverse wall. The first grooved edge and the second grooved edge are configured to be set so that the first transverse axis and the second transverse axis are parallel to each other.

The first grooved edge 402 has a first groove 402a extending along the first transverse axis. The second grooved edge 404 has a second groove 404a extending along the second transverse axis. The first groove 402a and the second groove 404a face each other.

The first lateral barrier 406 is an elongated beam extending along a third axis and having a first tenons 406a and a second tenon 406b extending from respective ends of the elongated beam. The second lateral barrier 408 is an elongated beam extending along a fourth axis and having a third tenon 408a and a fourth tenon 408b extending from respective ends of the elongated beam. The first tenon 406a and the third tenon 408a are configured for entering the first groove 402a. The second tenon 406b and the fourth tenon 408b are configured for entering the second groove 402b.

The first grooved edge 402 and the second grooved edge are parallel to each other, the first lateral barrier 406 and the second lateral barrier 408 are parallel to each other, and the first lateral barrier 406 and the second lateral barrier 408 are perpendicular to the first grooved edge 402 and to the second grooved edge 404. In this manner, the first lateral edge 406 and the second lateral edge 408 are configured to slide between the first groove edge and the second grooved edge, along an axis parallel to the first axis of the first grooved edge and to the second axis of the second grooved edge, as shown by the first arrow 410 and the second arrow 412, respectively. The lateral barriers include a hydrophobic coating, such as PFTE.

As seen in FIG. 17, the first grooved edge 402, the second grooved edge 404, the first lateral barrier 406, and the second lateral barrier 408 are flush with each other and with the rim 112. The first transverse compression barrier 102 and the second transverse compression barrier 104 (if present) are placed on top of the rim 112 and are configured to move along the rim 112 in a direction perpendicular to the direction of motion of the lateral barriers, as explained above.

Figure 18:
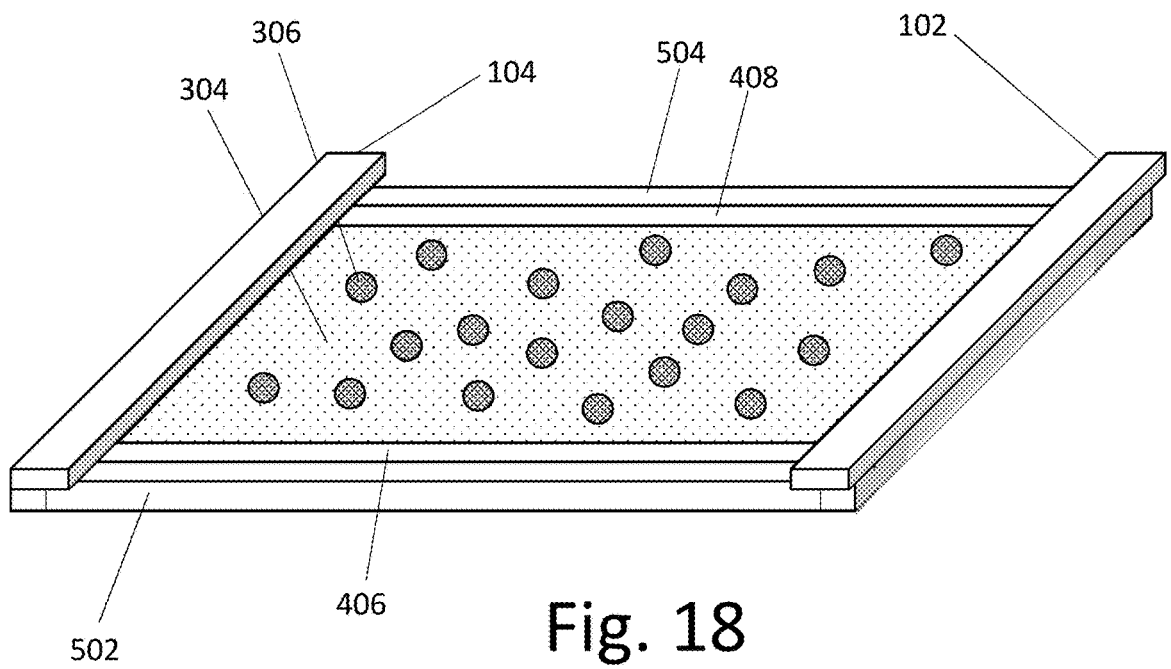
FIGS. 18-20 illustrate different stages of the use of the adjustment apparatus for creating a layer of material on the surface of a subphase liquid, according to some embodiments of the present invention.
Figure 19:
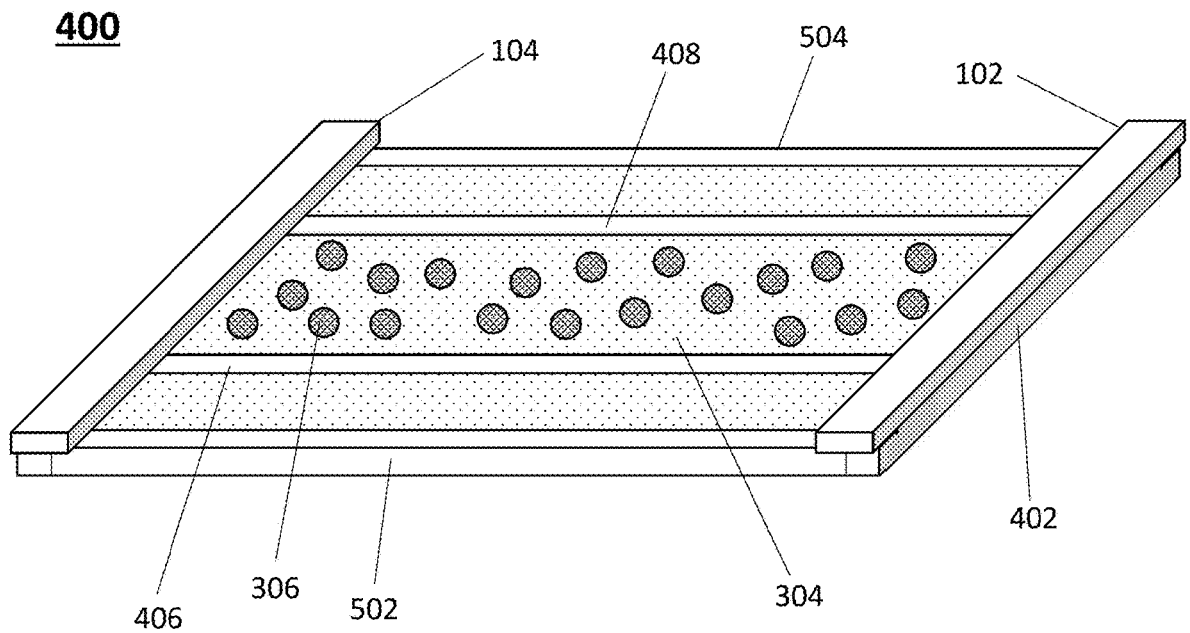
Figure 20:
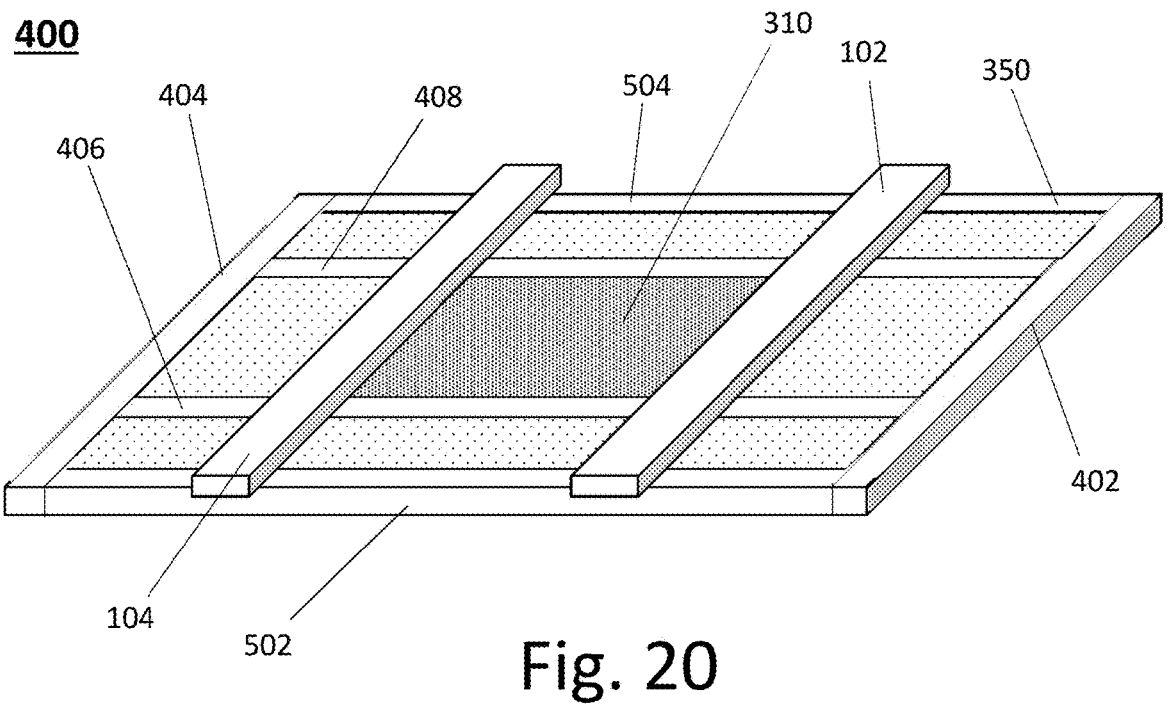

FIGS. 18-20 illustrate different stages of the use of the adjustment apparatus 400 for creating a layer of material on the surface of a subphase 304 liquid, according to some embodiments of the present invention.

In FIG. 18, the lateral barriers contact 406 and 408 respective lateral walls 502 and 504 of the trough base. The trough is filled the brim with a subphase liquid 304, so a meniscus is formed in the surface surrounded by the lateral barriers 406 and 408 and the transverse barriers 102 and 104. Particles 306 of a first material are spread over the surface of the subphase liquid 304 and float over the surface of the subphase liquid 304.

In FIG. 19, the first lateral barrier 406 is moved away from the first lateral wall 502 toward the second lateral wall 504 and the second lateral barrier 408 is moved away from the second lateral wall 504 toward the first lateral wall 502. As the lateral barriers move toward each other, the lateral barriers push the particles 306, as explained above, in FIGS. 4 and 5 with reference to the first and second transverse compression barriers. Each lateral barrier prevents the passage of the particles from one side of the lateral barrier to the other side of the lateral barrier.

In FIG. 20, the first transverse barrier 102 and the second transverse barrier 104 are moved toward each other, further bring the particles closer together until a layer 310 is formed on the surface of the subphase liquid. In this manner, both the length and the width of the surface of the layer 310 are adjustable.

Figure 21:
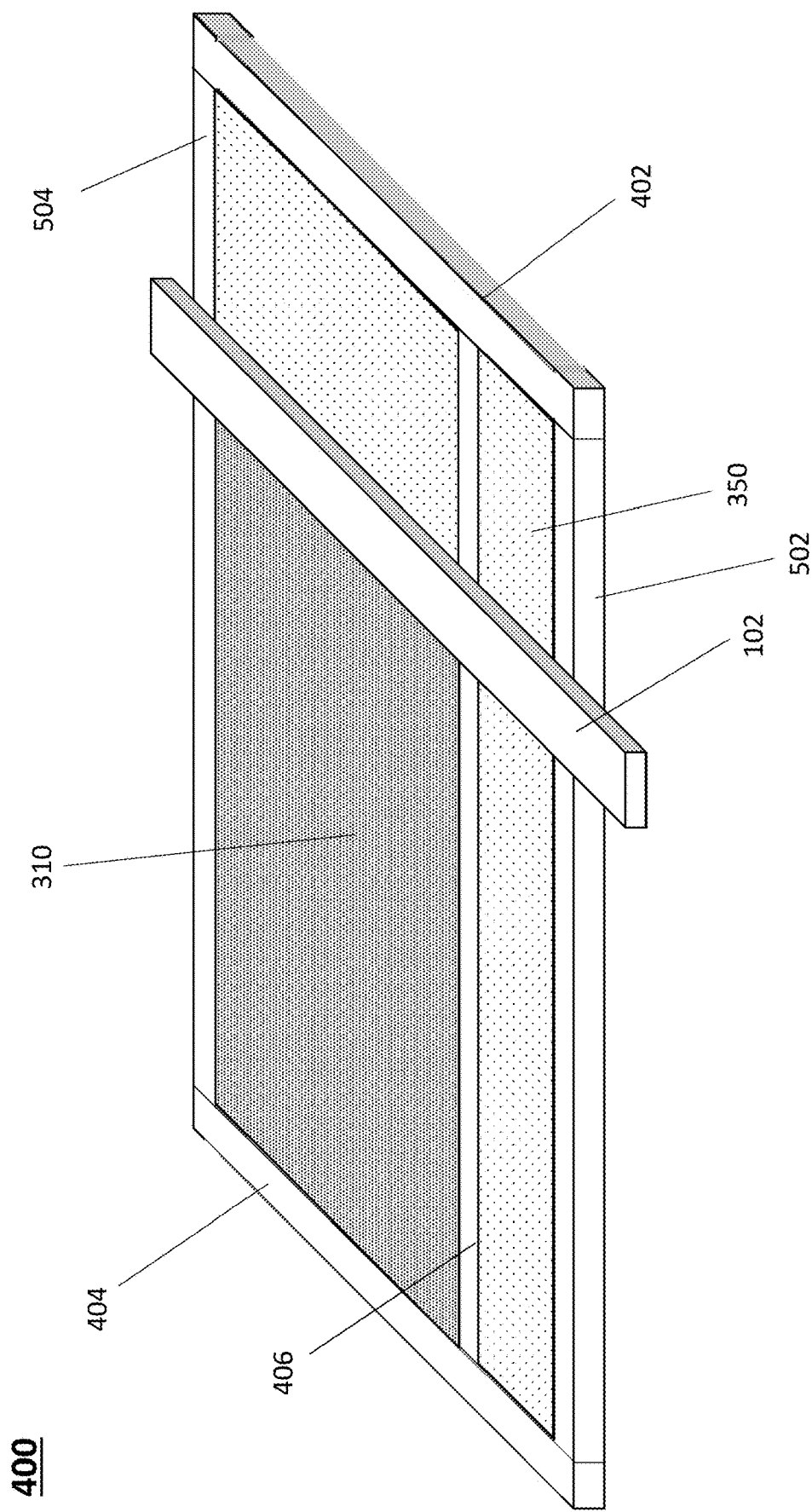
FIG. 21 illustrates an adjustment apparatus including a single transverse compression barrier and a single lateral barrier, according to some embodiments of the present invention.

FIG. 21 illustrates an adjustment apparatus 400 including a single transverse compression barrier 102 and a single lateral barrier 406, according to some embodiments of the present invention.

In the embodiment of FIG. 21, the length of the surface of the layer 310 is the distance between the first transverse compression barrier 102 and the second grooved edge 404, while the width of the surface of the layer 310 is the distance between the first lateral barrier 406 and the second lateral wall 504 of the trough base. The length of the surface of the layer 310 is adjusted by moving the first transverse compression barrier 102, while the width of the surface of the layer 310 is adjusted by moving the first lateral barrier 406.

Figure 22:
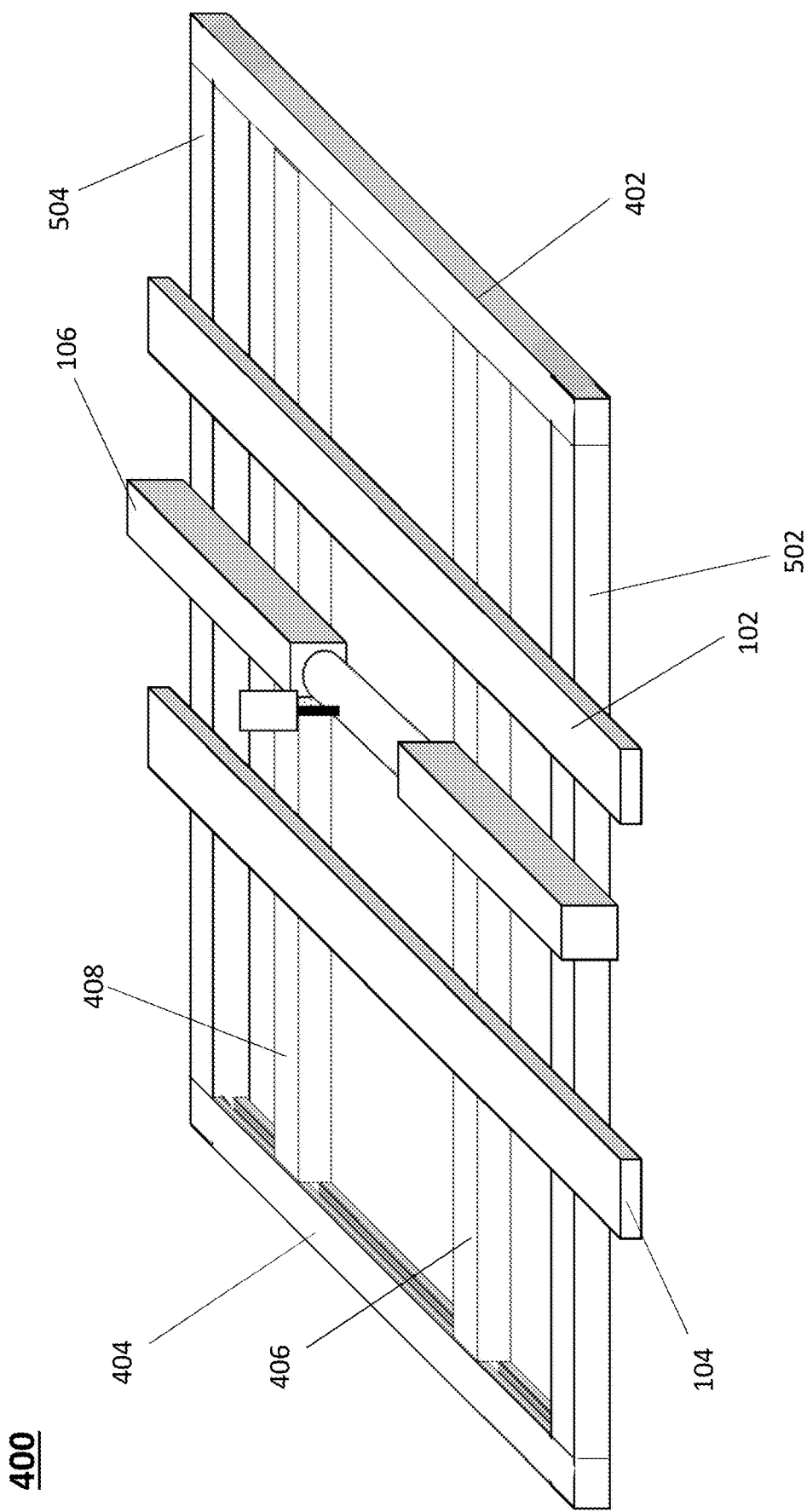
FIG. 22 illustrate an adjustment apparatus for a LB trough having two transverse compression barriers and a middle barrier, according to some embodiments of the present invention.

FIG. 22 illustrates an adjustment apparatus 400 for a LB trough having two transverse compression barriers and a middle barrier, according to some embodiments of the present invention. The adjustment apparatus of FIG. 22 is similar to the adjustment apparatus of FIG. 16, 17 or 21, and has at one or two transverse compression barriers (102, 104), one or two lateral barriers (406, 408), and a middle barrier 106. If two transverse compression barriers are present, the middle barrier 106 is located between the first transverse compression barrier 102 and the second compression barrier 104. If only one transverse compression barrier is present (e.g., the first transverse compression barrier 102), the middle barrier 106 is located between the first transverse compression barrier 102 and the second grooved edge 404.

Figure 23:
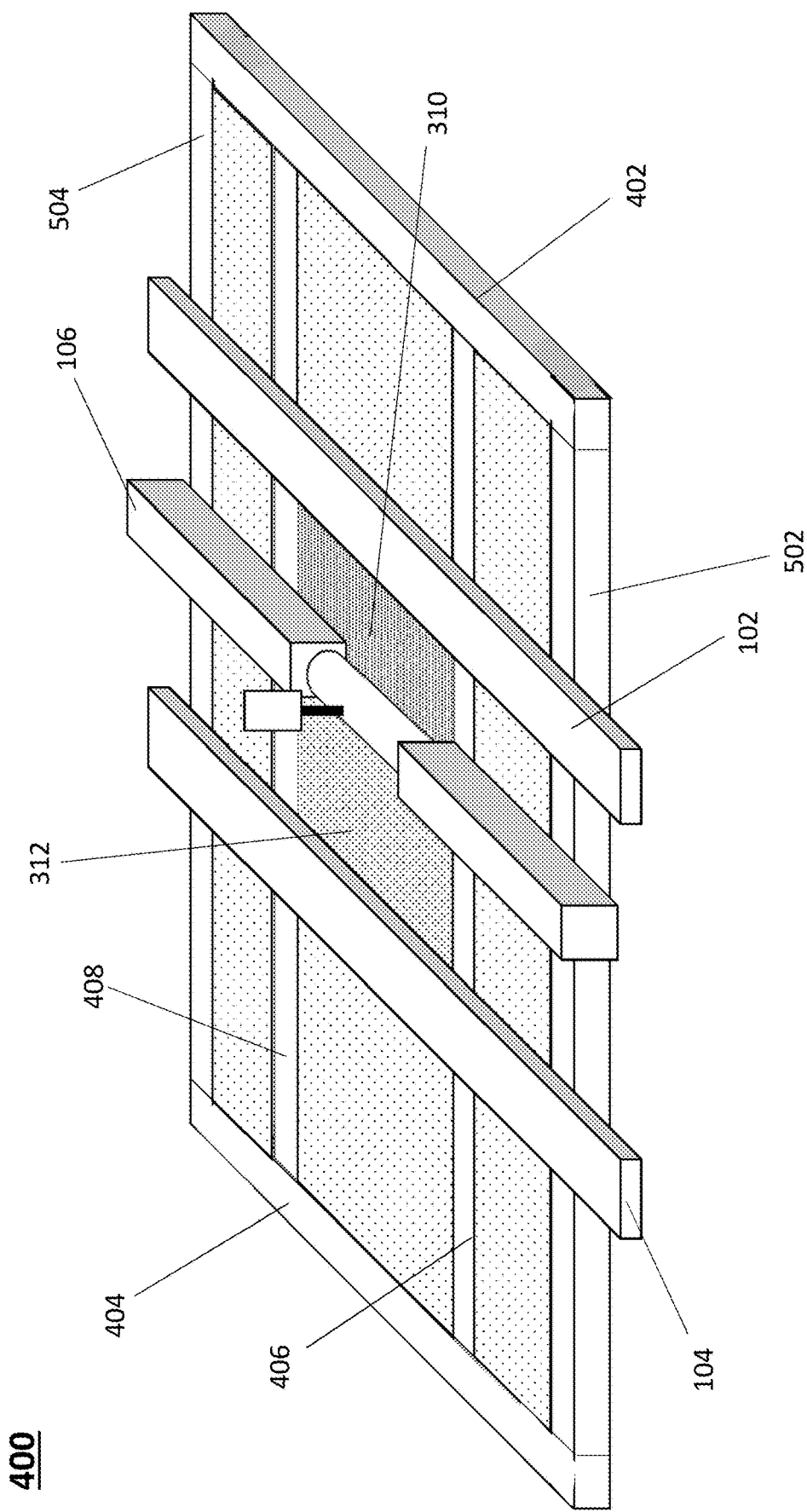
FIG. 23 shows two different layers formed in a LB trough having the adjustment apparatus of FIG. 22.

FIG. 23 show two different layers formed in a LB trough having the adjustment apparatus 400 of FIG. 22.

The first layer 310 has a first length and a first width. The first length is the distance between the first transverse compression barrier 102 and the middle barrier 106. If two lateral barriers are present, the first width is the distance between the first lateral barrier 406 and the second lateral barrier 408. If one lateral barrier is present, the first width is the distance between the first lateral barrier 406 and the second wall 504 of the trough base.

The second layer 312 has a second length and a second width. If two transverse compression barriers are present, the second length is the distance between the middle barrier 106 and the second transverse barrier 104. If only one transverse compression barrier 102 is present, the second length is the distance between the middle barrier 106 and the second grooved edge 404.

The second width is equal to the first width. Therefore, if two lateral barriers are present, the second width is the distance between the first lateral barrier 406 and the second lateral barrier 408. If one lateral barrier is present, the second width is the distance between the first lateral barrier 406 and the second wall 504 of the trough base.

FIGS. 24-27 illustrate different stages of an assembly of an LB trough having two transverse compression barriers and a middle barrier, according to some embodiments of the present invention. FIG. 28 is a side cross-section of an LB trough of FIGS. 24-27.

Figure 24:
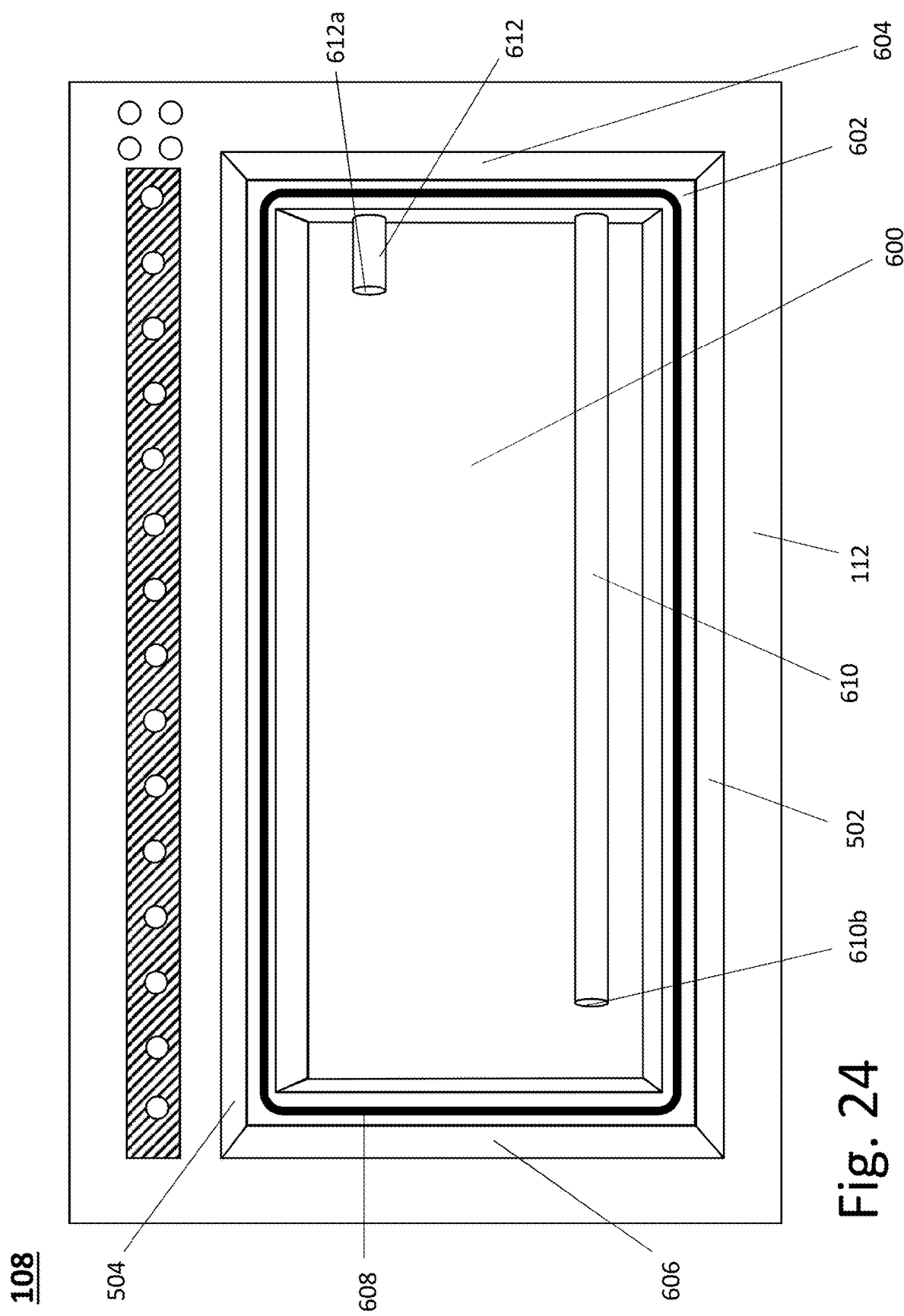
FIGS. 24-27 illustrate different stages of an assembly of an LB trough having two transverse compression barriers and a middle barrier, according to some embodiments of the present invention.

In FIG. 24, a top view of a trough base 108 is shown. The trough base 108 includes a bath volume 600 having a lower rim 602. The lower rim 602 may be a horizontal rim. In some embodiments of the present invention, the lower rim 602 is configured to support a water sealing unit 608, as will be explained further below.

The lower rim 602 is surrounded by four walls: a first lateral wall 502, a second lateral wall 504, a first transverse wall 604, and a second transverse wall 606. The first lateral wall 502 and the second lateral 504 wall are opposite to each other. The first transverse wall 604 connects to the first lateral wall 502 and to the second lateral wall 504. The second transverse wall 606 connects to the first lateral wall 502 and to the second lateral wall 504. The first lateral wall 502, the second lateral wall 504, the first transverse wall 604, and the second transverse wall 606 form a second volume above the bath volume 600, which is surrounded by an upper rim 102.

In some embodiments of the present invention, the trough base 108 includes a first pipe 610 and a second pipe 612. The first pipe 610 has a first inlet 610a outside the trough base and a first outlet 610b inside the bath volume of the trough base. The second pipe 612 has a second inlet 612a in the bath volume of the trough base and a second outlet 612b outside the trough base.

A temperature-controlled liquid, which may or may not be the same as the subphase liquid is kept in a temperature-controlled bath outside the trough base 108. The temperature-controlled liquid from the reservoir enters the first inlet 610a of first pipe 610 and enters the bath volume 600 via the first outlet 610b of the first pipe 610. Liquid from the bath volume 600 leaves the bath volume 600 via the second inlet 612a of the second pipe and is exhausted in the reservoir via the second outlet 612b of the second pipe 600. In this manner, a flow of temperature-controlled liquid can be maintained in the bath volume.

In some embodiments of the present invention, the first outlet 610b is in proximity of a first corner of the bath volume while the second inlet 612a is in proximity of a second corner of the bath volume that is diagonally opposite to the first corner. In this manner, the flow of liquid inside the bath volume 600 is maintained and not short-cut. This enables maintaining uniform thermal distribution and circulation inside the bath volume. This is important since the liquid 620 in the bath volume is configured to maintain the temperature of the subphase liquid 304 within a desired range.

Figure 25:
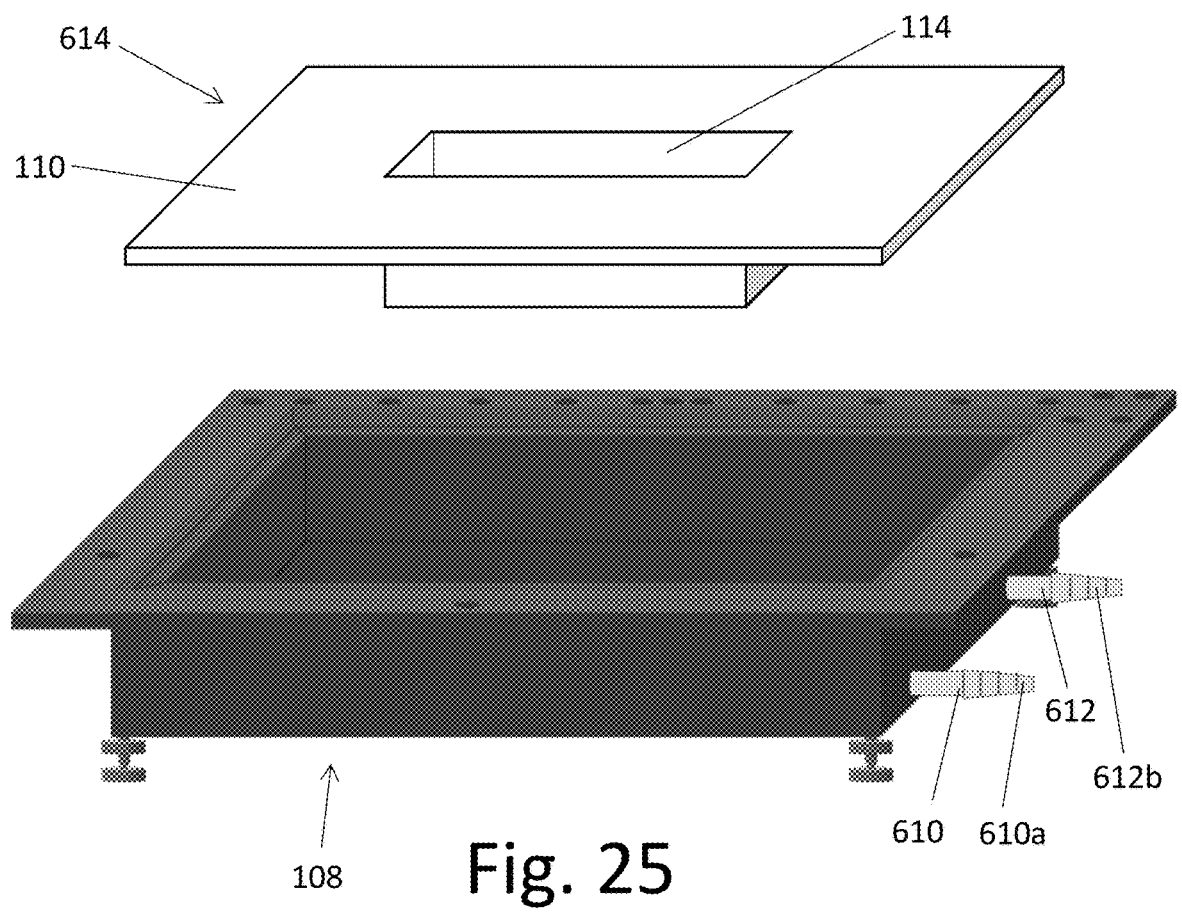

In FIG. 25, a dipping well unit 614 is shown above the trough base 108. The dipping well unit 614 includes a platform 110 surrounding a well 114. The well is open in top and closed on the bottom. The platform is configured to be inserted in the trough base 108 and to be supported by the lower rim 602. The well 114 extends downwards into the bath volume of the trough base 108.

Optionally the water sealing unit 608 is placed between the platform 110 and the lower rim 602, and contacts both the platform 110 and the lower rim 602. In this manner liquid 620 from the bath volume, which is generally in motion (as explained above), is separated from the subphase liquid 304 located on the platform 110 and the well 114. The subphase liquid 304 is generally required to be static.

Figure 26:
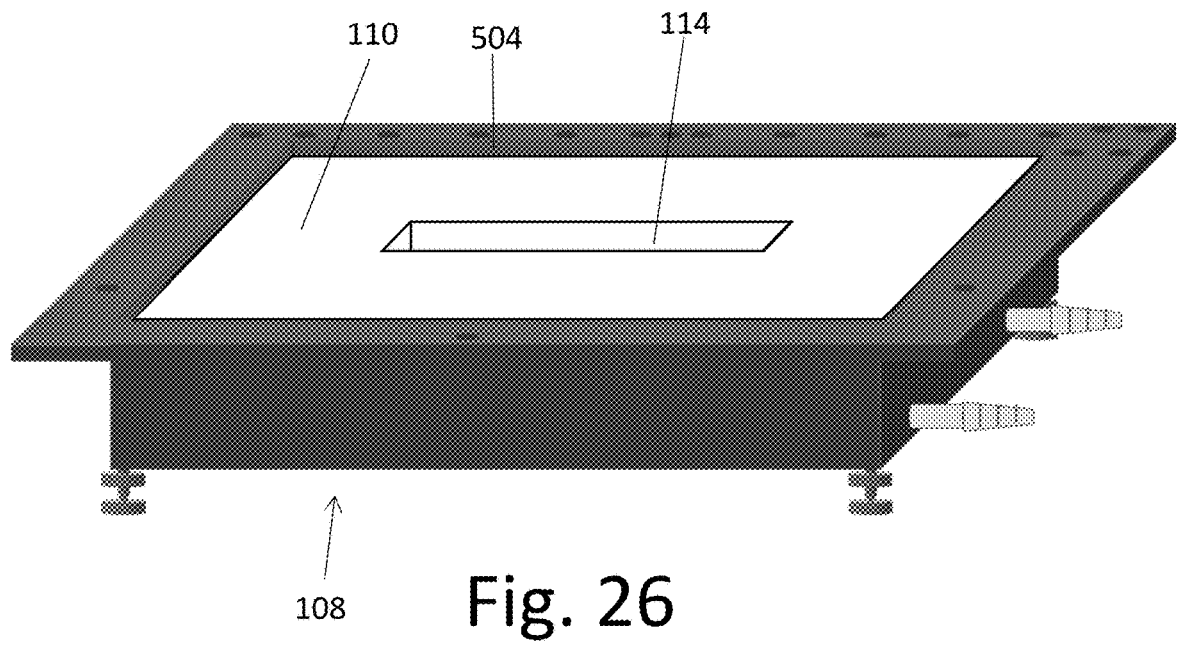
Figure 27:
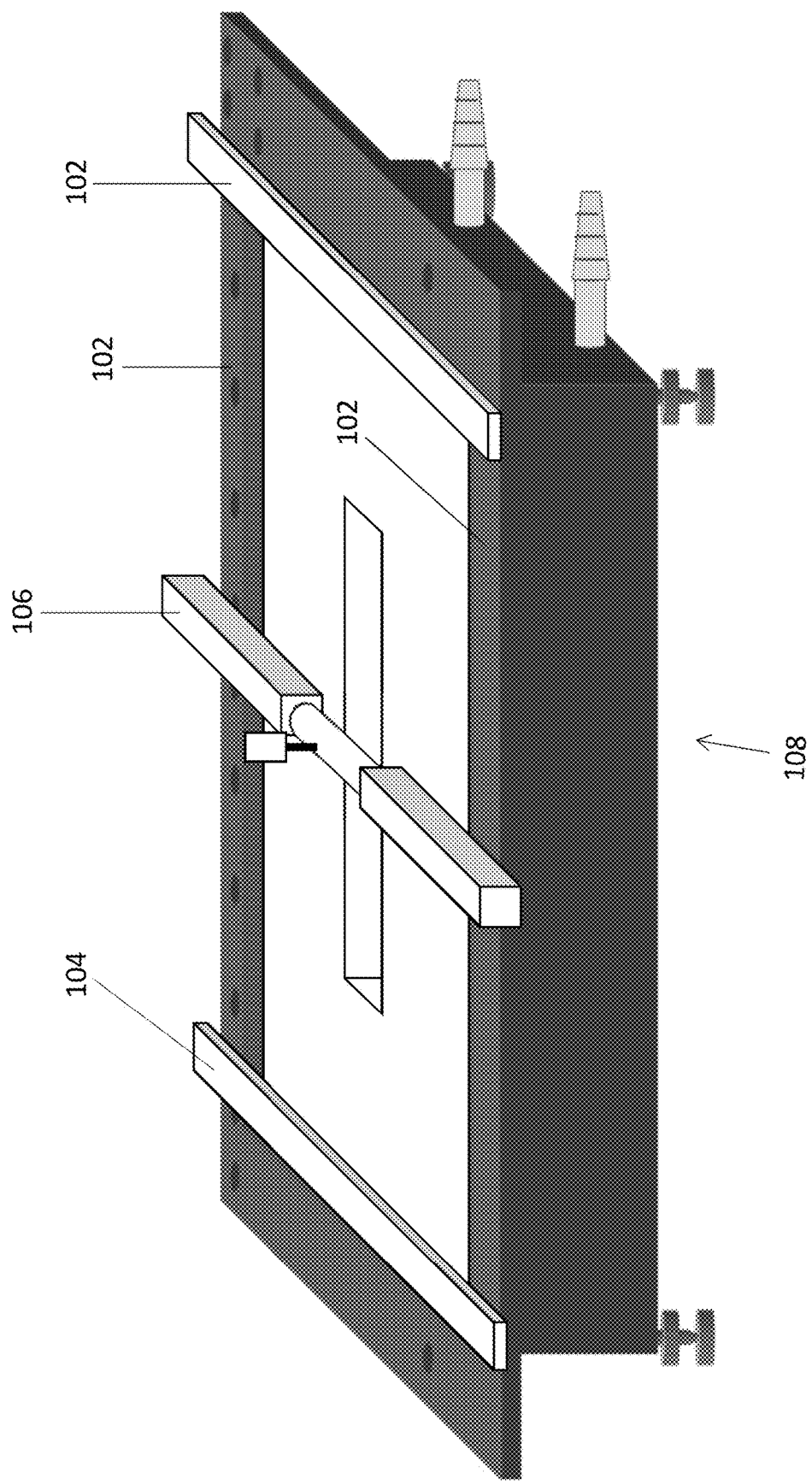
Figure 28:
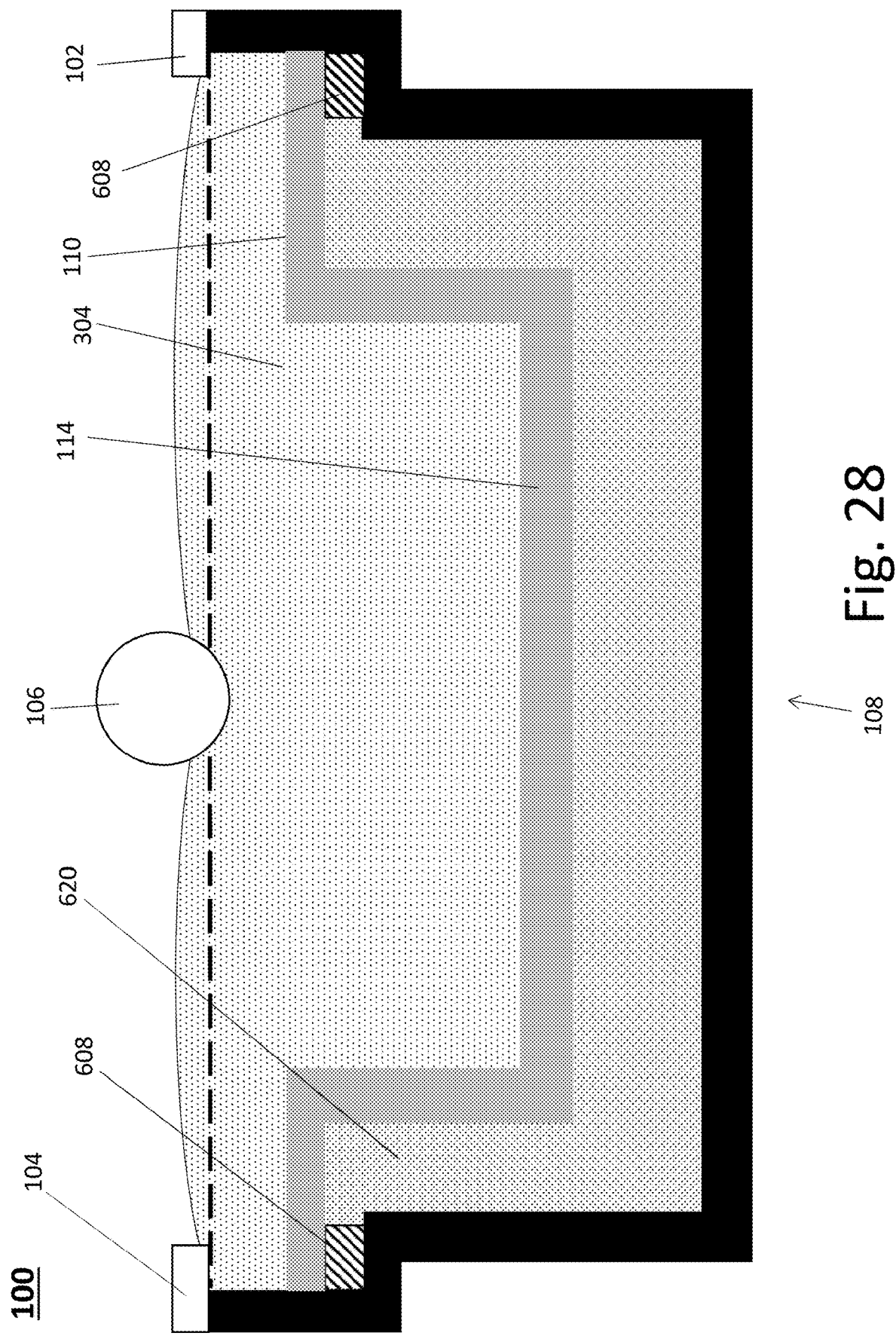
FIG. 28 is a side cross-section of an LB trough of FIGS. 24-27.
Figure 29:
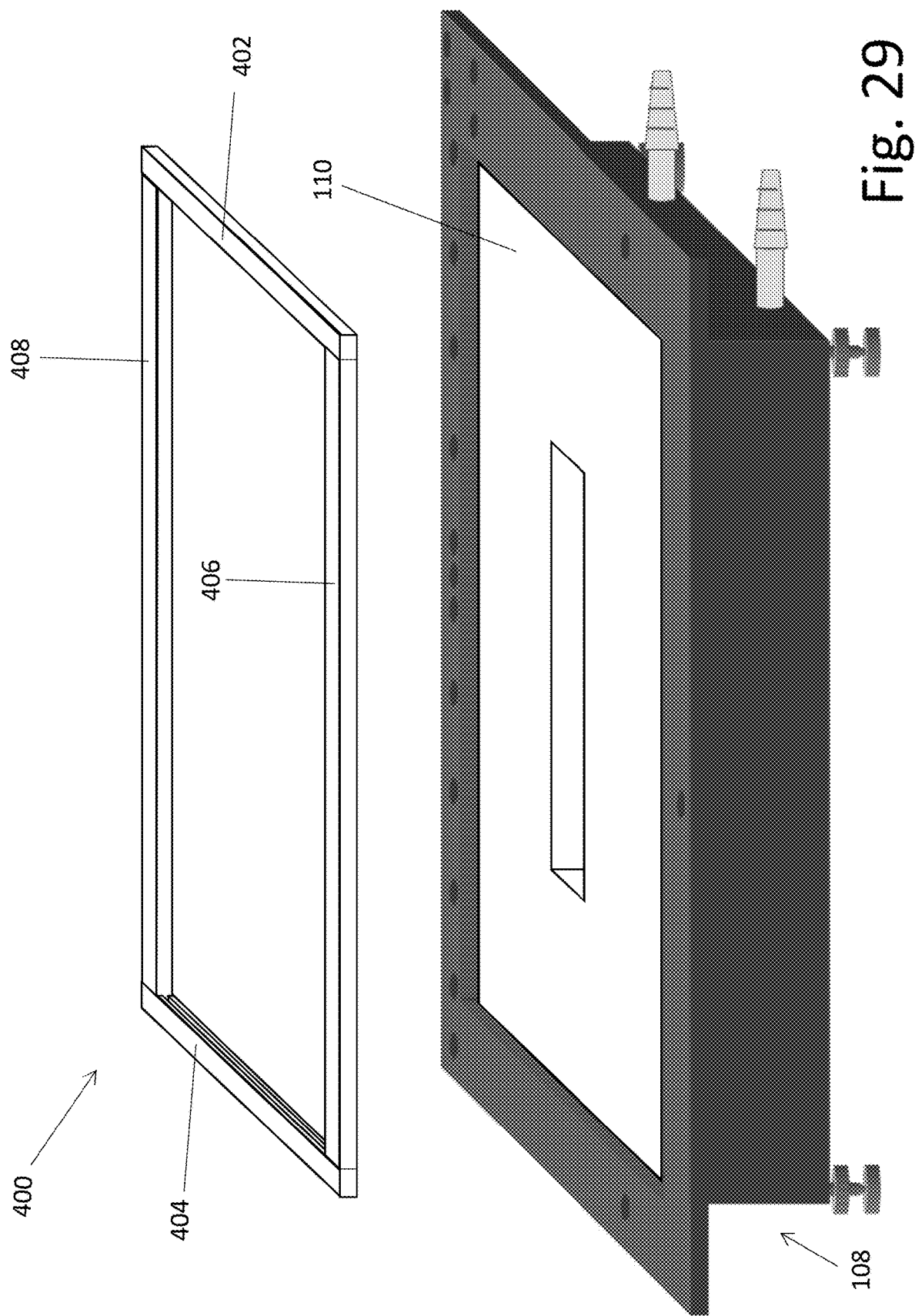
FIGS. 29-32 illustrate different stages of an assembly of an LB trough having the apparatus of FIGS. 16 and 17, according to some embodiments of the present invention.
Figure 30:
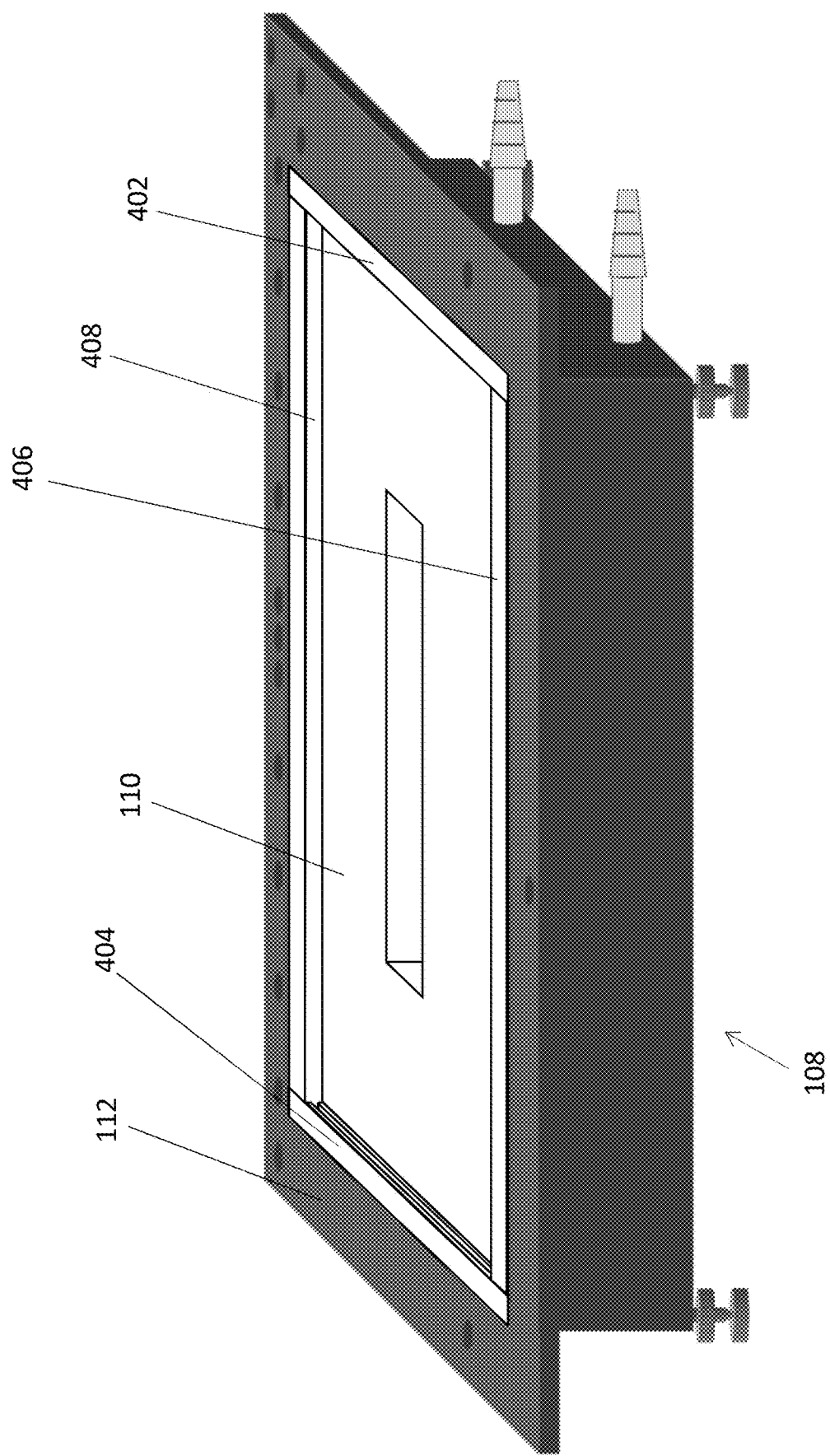

As can be seen in FIGS. 26, 27, and 28, the upper surface of the platform is located below the upper rim 102. In this manner, subphase liquid 304 can be poured on the platform and the well and be contained by the walls 502, 504, 604, and 606 of the trough base 108.

In FIG. 27, a first transverse barrier 102 and a middle barrier 106 are placed on the upper rim 112, and may be used for forming layers, as explained above. Optionally, a second transverse barrier 104 is also placed on the upper rim 112.

FIGS. 29-32 illustrate different stages of an assembly of an LB trough having the adjustment apparatus 400 of FIGS. 16 and 17, according to some embodiments of the present invention. FIG. 33 is a side cross section of the LB trough of FIGS. 29-32.

The LB trough of FIGS. 29-33 includes the adjustment apparatus 400 described above. The adjustment apparatus 400 is placed on top of the platform. The first grooved edge 402 contacts the first transverse wall 604. The second grooved edge 404 contacts the second transverse wall 606. The top surfaces of the first grooved edge 402, the second grooved edge 404, and of the side barriers 406 and 406 are flush with the upper rim 112 of the trough base 108, as explained above.

Figure 31:
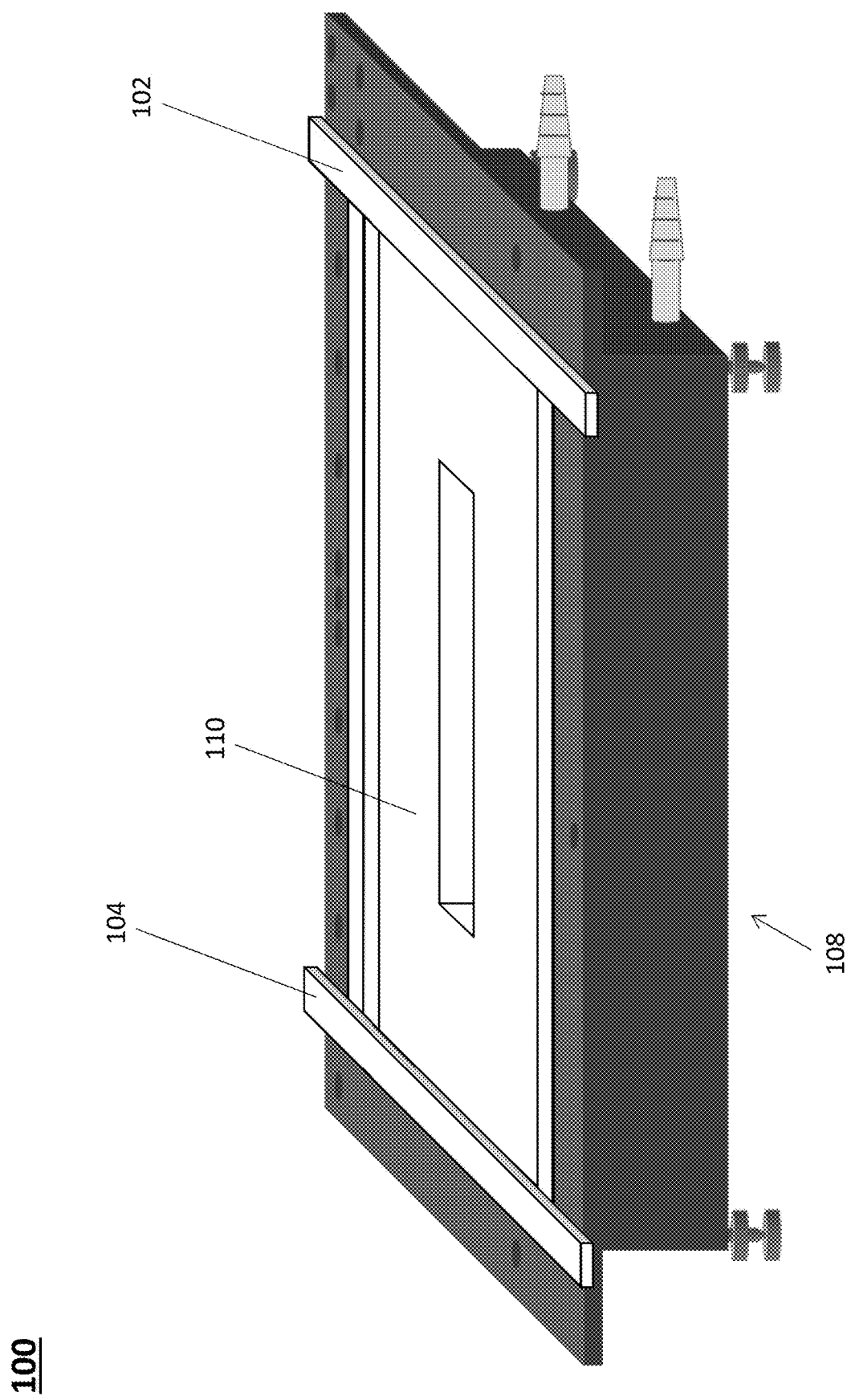

In FIG. 31, after the adjustment apparatus has been placed on the platform 110, the first transverse compression barrier 102 is placed on the upper rim 112, as explained above. Optionally, a second compression barrier 104 is present as well and placed on the upper rim 112, as explained above.

Figure 32:
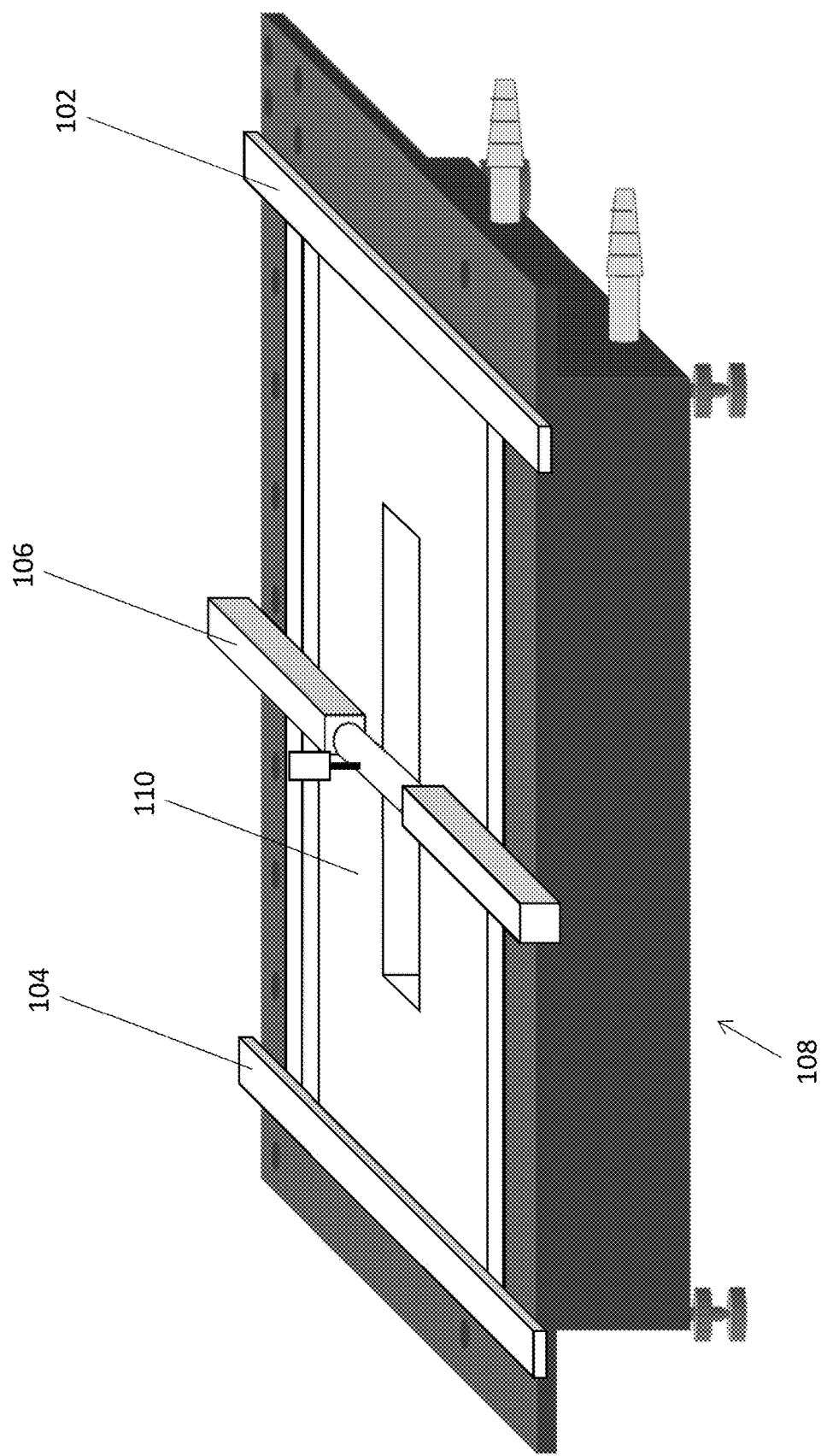
Figure 33:
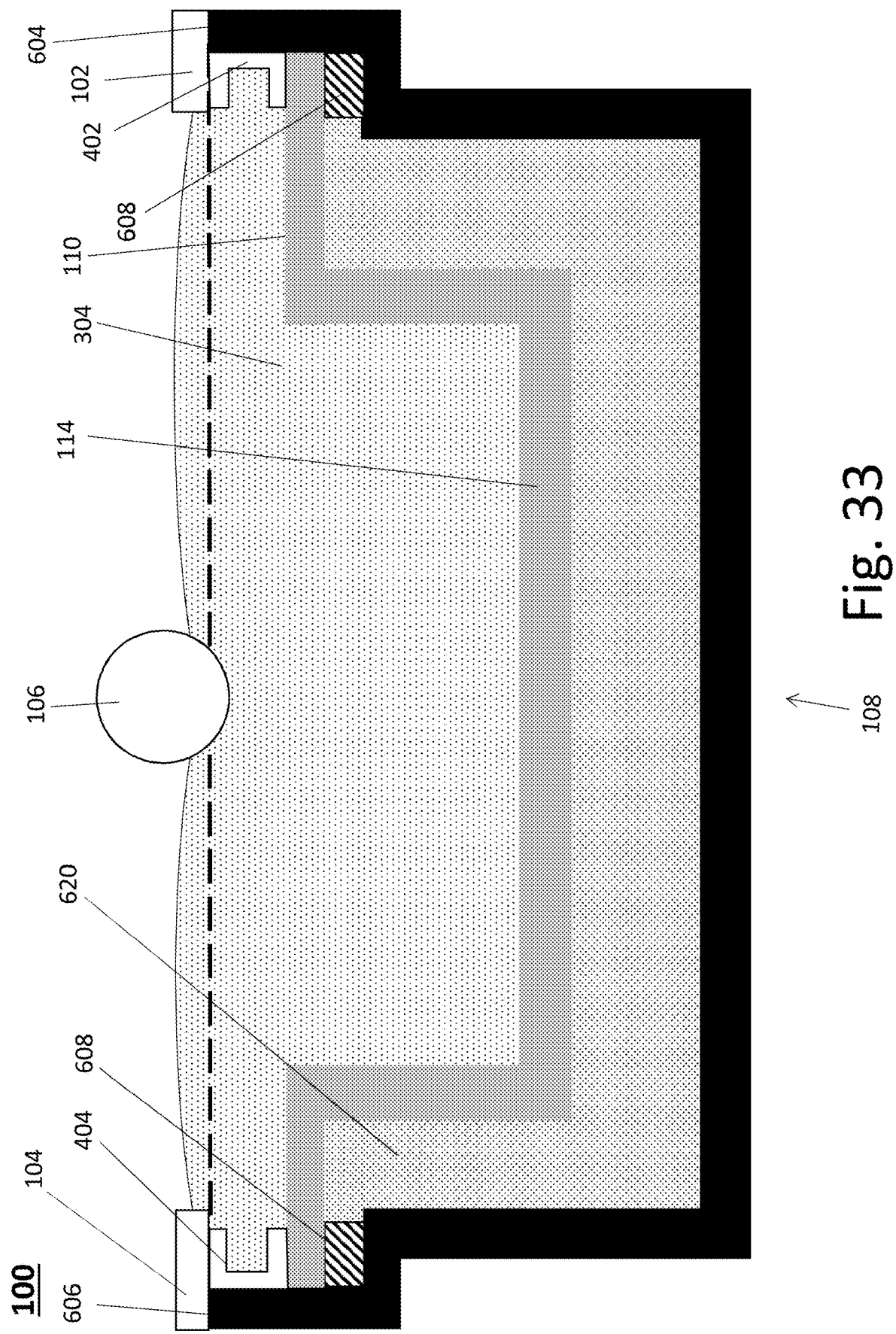
FIG. 33 is a side cross section of the LB trough of FIGS. 29-32.

In some embodiments of the present invention, as shown in FIG. 32, the LB trough 100 also includes a middle barrier 106, as explained above. The middle barrier 106 is placed between the first and second transverse compression barriers or between the first transverse barrier and the second transverse wall, as explained above.

Figure 34:
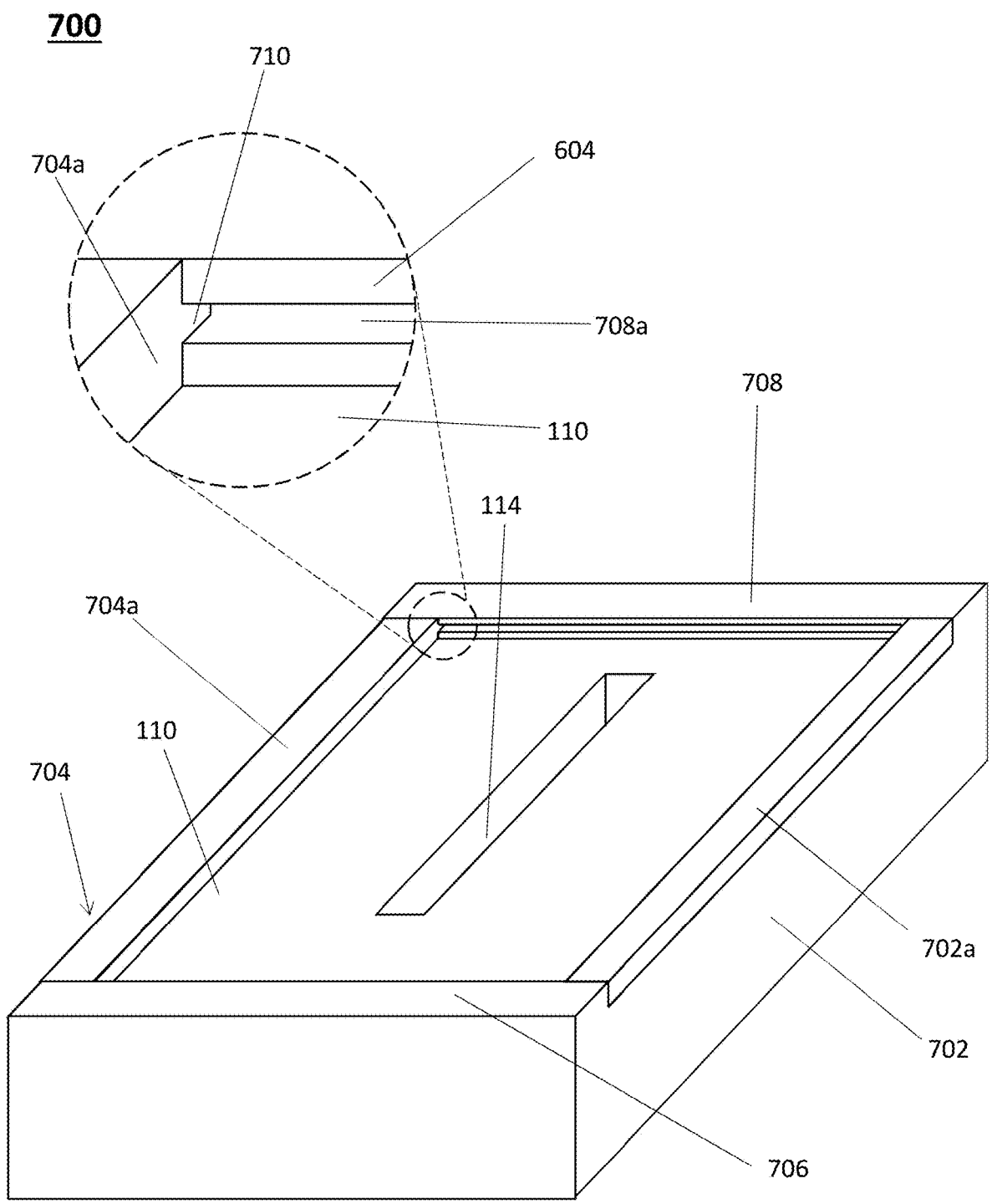
FIG. 34 illustrate an LB trough having at least one movable side wall, according to some embodiment of the present invention.

FIG. 34 illustrate an LB trough 700 having at least one movable side wall, according to some embodiment of the present invention.

The LB trough 700 is similar to the LB trough 100 described above. However, the LB trough 700 does not need an adjustment apparatus 400 as described above, for example in FIG. 16. This is because the LB trough 700 includes a first side wall 702 and a second side wall 704, of which at least one has a top section (702a, 704a) which is movable sideways. The top sections of the side walls are located above the platform 110, to enable unimpeded motion of the top sections of the side walls.

The LB trough 700 includes a first transverse wall 706 and a second transverse wall 708. The first transverse wall 706 has a first groove (not shown), while the second transverse wall 708 has a second groove 708a. The top section of at least one of side walls has two tenons, each at a respective end of the top section. Each tenon enters a respective groove of the transverse walls. For example, in FIG. 34, the tenon 710 of the top section 704a is shown inside the groove 708a of the second transverse wall 708a. This enable the top section to travel laterally while still being joined to the transverse walls.

In some embodiments of the present invention, both top sections include tenons and are movable. In some embodiments of the present invention, only one of the top sections includes tenons and is movable. One or more barriers may be placed on top of the LB trough 700, as explained above, for example in FIGS. 1a through 2b. The operation of the LB trough 700 is similar, mutatis mutandis, to the operation of the adjustment apparatus 400, as described in FIGS. 16-23.

What is claimed is:
1. A Langmuir-Blodgett trough, comprising:
a walled trough base, configured for holding a subphase liquid, the trough base comprising:
a first side wall;
a second side wall opposite to and parallel to the first side wall;
a first transverse wall joined to the first side wall and to the second side wall;
a second transverse wall opposing to and parallel to the first transverse wall and joined to the first side wall and to the second side wall;
a middle barrier extending along a central axis thereof across the trough base from the first side wall to the second side wall and configured to contact a first material located on a surface of the subphase liquid on a first side of the middle barrier and to contact a second material located on the surface of the subphase liquid on a second side of the middle barrier, the middle barrier configured to prevent passage of the first material from the first side to the second side of the middle barrier and to prevent passage of the second material from the second side to the first side of the middle barrier;
an adjustment apparatus which comprises:
a first grooved edge joined to the first transverse wall and a second grooved edge joined to the second transverse wall, the first grooved edge and second grooved edges comprising respectively, a first groove and a second groove extending transversally and facing each other;
a first side barrier and a second side barrier parallel to each other and extending between the first grooved edges, the first side barrier having a first tenon and a second tenon and the second side barrier having a third tenon and a fourth tenon, the first tenon being located at a first end of the first side barrier, the second tenon being located at a second end of the first side barrier, the third tenon being located at a first end of the second side barrier, the fourth tenon being located at a second end of the second side barrier, the first tenon and the third being configured to enter the first groove, and the second tenons and the fourth tenon being configured to enter the second groove, thereby restricting a motion of the first and second side barriers along an axis parallel to the first and second transverse walls;
wherein:
the middle barrier comprises a rotatable section configured to be rotated along a rotation axis parallel to the central axis, and a substrate holder joined to the rotatable section and configured to rotate with the rotatable section;
the substrate holder is configured to hold a substrate, such that a rotation of the substrate holder is configured to dip the substrate into the subphase liquid via the first material and to cause the substrate to emerge from the subphase liquid via the second material, thereby enabling the substrate to be coated with the first material and the second material via a single rotational motion;
the motion of the first and second side barriers is configured to adjust the surface areas of the first material and the second material floating on the subphase liquid, while enabling the subphase liquid to move under the first and second side barriers.

2. The Langmuir-Blodgett trough of claim 1, wherein: the first material and the second material are the same material.

3. The Langmuir-Blodgett trough of claim 1, wherein the rotatable section is configured to be selectively rotated both clockwise or counter-clockwise around the rotation axis.

4. The Langmuir-Blodgett trough of claim 1, wherein the walled trough base comprises a platform elevated with respect to a bottom of the trough base, the platform being surrounded by and in contact with walls of the trough base, the platform comprising a dipping well which extends downward and is closed on the bottom, such that the subphase fluid is configured to be contained on the platform and in the well.

5. The Langmuir-Blodgett trough of claim 1, wherein the middle barrier comprises:
a first end section configured to be positioned on the first side wall;
a second end section configured to be positioned on the second side wall;
wherein the rotatable section is located between the first end section and the second end section and is configured to be partially submerged in the subphase liquid.

6. The Langmuir-Blodgett trough of claim 5, wherein the middle barrier comprises:
a proximal barrier section joined to the first end section and to the rotatable section and configured to be partially submerged in the subphase liquid;
a distal barrier section joined to the second end section and to the rotatable section and configured to be partially submerged in the subphase liquid;
wherein the proximal barrier section and the distal barrier section are configured not to rotate while the rotatable section rotates.

7. The Langmuir-Blodgett trough of claim 1, wherein the middle barrier is parallel to the first transverse wall and the second transverse wall.

8. The Langmuir-Blodgett trough of claim 1, wherein the middle barrier is configured to be moveable between the first transverse wall and the second transverse wall.

9. The Langmuir-Blodgett trough of claim 1, wherein: The rotatable section of the middle barrier is rotated by a connected motor.

10. The Langmuir-Blodgett trough of claim 1, comprising:
a first transverse compression barrier, extending across the trough base along a first axis, and configured for being moved along a first motion axis at a non-zero angle with the first axis, the first transverse barrier being configured to contact the first material located on the surface of the subphase liquid and to prevent passage of the first material from a first side to a second side of the first transverse barrier;
a second transverse compression barrier, extending across the trough base along a second axis parallel to the first axis, and configured for being moved along a second motion axis parallel to the first motion axis, the second transverse barrier being configured to contact the second material located on the surface of the subphase liquid and for preventing passage of the second material from a first side to a second side of the second transverse barrier;
wherein the middle barrier is located between the first transverse compression barrier and the second transverse compression barrier;
wherein movement of the first transverse compression barrier toward the middle barrier is configured to compress the first material floating on the subphase liquid between the first transverse compression barrier and the middle barrier to form a first layer, while enabling the subphase liquid to move under the first transverse compression barrier; and
wherein movement of the second transverse compression barrier toward the middle barrier is configured to compress the second material floating on the subphase liquid between the second transverse compression barrier and the middle barrier to form a second layer, while enabling the subphase liquid to move under the second transverse compression barrier.

11. The Langmuir-Blodgett trough of claim 1, wherein the rotation axis is the central axis.

12. The Langmuir-Blodgett trough of claim 1, wherein the first material and the second material are different materials.

* * * * *